United States Patent
Kim et al.

(10) Patent No.: US 11,330,513 B2
(45) Date of Patent: May 10, 2022

(54) METHOD FOR CONTROLLING TERMINAL FOR CELLULAR IOT SERVICE IN 5G MOBILE COMMUNICATION SYSTEM

(71) Applicant: Samsung Electronics Co., Ltd., Gyeonggi-do (KR)

(72) Inventors: Sunghoon Kim, Gyeonggi-do (KR); Youngkyo Baek, Gyeonggi-do (KR); Jungje Son, Gyeonggi-do (KR); Hoyeon Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/055,462

(22) PCT Filed: May 14, 2019

(86) PCT No.: PCT/KR2019/005801
§ 371 (c)(1),
(2) Date: Nov. 13, 2020

(87) PCT Pub. No.: WO2019/221493
PCT Pub. Date: Nov. 21, 2019

(65) Prior Publication Data
US 2021/0185598 A1    Jun. 17, 2021

(30) Foreign Application Priority Data

May 14, 2018  (KR) .................. 10-2018-0054847
Jun. 28, 2018  (KR) .................. 10-2018-0074742
(Continued)

(51) Int. Cl.
*H04W 28/18*    (2009.01)
*H04W 48/16*    (2009.01)
(Continued)

(52) U.S. Cl.
CPC ............. *H04W 48/16* (2013.01); *G16Y 10/75* (2020.01); *H04W 72/12* (2013.01); *H04W 28/18* (2013.01)

(58) Field of Classification Search
CPC ........... H04W 4/18; H04W 4/50; H04W 8/22; H04W 72/0413; H04W 72/04;
(Continued)

(56) References Cited

U.S. PATENT DOCUMENTS

2011/0075675 A1    3/2011  Koodli et al.
2013/0084878 A1*   4/2013  Chen ..................... H04W 72/10
                                                  455/452.1
(Continued)

FOREIGN PATENT DOCUMENTS

KR    1020190119490    10/2019
WO    WO 2017201157    11/2017

OTHER PUBLICATIONS

3GPP TS 23.501 V16.0.0, dated Mar. 28, 2019 (p. 232-234) (Year: 2019).*

(Continued)

*Primary Examiner* — Daniel Lai
(74) *Attorney, Agent, or Firm* — The Farrell Law Firm, P.C.

(57) ABSTRACT

The present disclosure relates to a communication technique for fusing, with an IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retail, and security and safety related services, on the basis of 5G communication technologies and IoT-related technologies. Disclosure is a
(Continued)

method for efficiently controlling a terminal for a cellular IoT service in a 5G mobile communication system.

15 Claims, 8 Drawing Sheets

(30) Foreign Application Priority Data

Apr. 2, 2019 (KR) .................. 10-2019-0038527
May 7, 2019 (KR) .................. 10-2019-0053257

(51) Int. Cl.
*G16Y 10/75* (2020.01)
*H04W 72/12* (2009.01)

(58) Field of Classification Search
CPC ............... H04W 72/042; H04W 76/27; H04W 72/0406; H04W 72/048; H04W 28/06; H04W 72/00; H04W 72/0446; H04W 24/02; H04W 24/04; H04W 76/25; H04W 28/0268; H04W 72/005; H04W 72/1268; H04W 72/1273; H04W 76/12; H04W 76/18; H04W 88/14; H04W 88/16; H04W 48/16; H04W 72/12; H04W 8/02; H04W 8/186; H04W 8/20; H04W 28/0257; H04W 48/12; H04W 72/1263; H04W 4/70; H04W 72/1278; G16Y 10/75
See application file for complete search history.

(56) References Cited

U.S. PATENT DOCUMENTS

| | | |
|---|---|---|
| 2017/0332421 A1 | 11/2017 | Sternberg et al. |
| 2018/0198867 A1* | 7/2018 | Dao ..................... H04W 76/30 |
| 2019/0116631 A1* | 4/2019 | Talebi Fard .......... H04W 68/02 |
| 2019/0150225 A1 | 5/2019 | Mohamed et al. |
| 2019/0306913 A1 | 10/2019 | Kim et al. |
| 2021/0167897 A1* | 6/2021 | Seidel .................. H04L 5/0055 |

OTHER PUBLICATIONS

Qualcomm Incorporated, "TR 23.724: Addressing Open Issues for Solution 1", S2-184416, SA WG2 Meeting #127, Apr. 16-20, 2018, 10 pages.
Huawei, HiSilicon, "NEF Based Infrequent Small Data Transfer via NAS-SM", S2-184415, 3GPP TSG-SA WG2 Meeting #127, Apr. 16-20, 2018, 4 pages.
European Search Report dated May 18, 2021 issued in counterpart application No. 19804510.6-1215, 11 pages.
PCT/ISA/210 Search Report issued on PCT/KR2019/005801, dated Aug. 21, 2019, pp. 5.
PCT/ISA/237 Written Opinion issued on PCT/KR2019/005801, dated Aug. 21, 2019, pp. 7.
3GPP TS 23.502 v15.1.0, '3GPP: TSGSSA; Procedures for the 5G System; Stage 2 (Release 15)', Mar. 27, 2018, pp. 287.
3GPP TR 23.724 v0.3.0, '3GPP: TSGSSA; Study on Cellular IoT support and evolution for the 5G System (Release 16)', May 2, 2018, pp. 156.

\* cited by examiner

METHOD FOR CONTROLLING TERMINAL FOR CELLULAR IOT SERVICE IN 5G MOBILE COMMUNICATION SYSTEM

PRIORITY

This application is a National Phase Entry of PCT International Application No. PCT/KR2019/005801 which was filed on May 14, 2019, and claims priority to Korean Patent Application Nos. 10-2018-0054847, 10-2018-0074742, 10-2019-0038527 and 10-2019-0053257, which were filed on May 14, 2018, Jun. 28, 2018, Apr. 2, 2019 and May 7, 2019, respectively, the content of each of which is incorporated herein by reference.

TECHNICAL FIELD

The detailed descriptions of the embodiments of the disclosure are provided mainly with reference to a new RAN (NR) and a packet core, which are a radio access network and a core network (a 5G system, a 5G core network, or a next generation core (an NG core)), in the 5G mobile communication standard specified by the 3GPP. However, the subject matter of the disclosure could be slightly modified without departing from the scope of the disclosure, and may be applied to other communication systems having a similar technical background. The modification and application thereof may be determined by those skilled in the art.

A CIoT service of the 5G system may support a function of transmitting data via a non-access stratum (NAS) message between a UE and a core network so that the core network transmits the same to an external data network, and may support a function of transferring data, transmitted from a UE, to an external server via a network exposure function (NEF).

Also, the 5G system provides a service for factory automation, which is referred to as industrial IoT. Robots and other devices used for factory automation are capable of communicating with each other via a cellular network, and may fall into the broad category of IoT equipment. These devices may need data communication which is sensitive to time. For example, the devices may need to transmit state information and a command message to another device within 10 ms over a network, and may be configured to provide needed state information at a predetermined time or to receive needed state information at a predetermined time.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Recently, there is a desire for a method and apparatus for efficiently controlling a user equipment (UE) in order to provide a cellular IoT service in a 5G mobile communication system, as Long Term Evolution (LTE) and LTE-Advanced have been developed.

DETAILED DESCRIPTION OF INVENTION

Technical Problem

In order to support a CIoT service in a 5G mobile communication system, a method of supporting the following two services is provided.

As one of IoT related services provided in the 5G mobile communication system, if downlink data to be transmitted to a user equipment (UE) is scheduled at a predetermined time, for example, at 9 AM on Monday, at 12 AM every day, or the like, a 3rd party application server (hereinafter, referred to as an AS) may provide the corresponding schedule information to a mobile communication network so the mobile communication network is capable of preparing data transmission to the UE at the corresponding time. The mobile communication network may perform control so that the UE is reachable at the time scheduled in the scheduled information, or may secure resources for data transmission. The disclosure provides a method that enables the corresponding UE to maintain the state of being connected to the mobile communication network at the scheduled data transmission time in the mobile communication network. The method is effective, particularly, to IoT UEs, which change to a state of not being reachable by the mobile communication network in order to reduce the amount of power consumed. A UE that performs a predetermined operation in order to reduce the amount of power consumed may be a UE that turns on a modem and wakes up only when having data to transmit (e.g., MICO mode), or a UE that operates by negotiating with a mobile communication network in order to reduce the amount of power consumed, and is incapable of receiving paging from the network during a predetermined period of time.

As another one of the IoT related services used in the 5G mobile communication system, there is an industrial IoT used for factory automation. The industrial IoT is required to transmit/receive data that is sensitive to a transmission time. For example, there may be requirements, such as a requirement that data be transmitted to a UE within 5 ms, or a requirement that data from a UE be transferred to a server within 10 ms. In case of the industrial IoT, a private network that only a corresponding factory can use may be configured and used. Also, a localized server may be prepared in a predetermined area of the factory so as to receive data from a UE, to analyze data, or to transmit data to a UE. If a server transmits data to a UE, a network wakes up the UE in an idle state, changes the UE to a connected state, allocates resources for data transmission, and transmits data. The process of changing the idle state to the connected state as described above may take time. As another example, if downlink data to be transmitted to a UE is scheduled at a predetermined time, for example, at 9 AM on Monday, at 12 AM every day, 10 minutes later from the present time, or the like, an application server (hereinafter referred to as an AS) may provide schedule information associated with the corresponding data transmission to a mobile communication network so the mobile communication network is capable of preparing data transmission to the UE at the corresponding time. The mobile communication network may perform control so that the UE is reachable at the time scheduled in the scheduled information, may enable the UE to be in the connected state so that data transmission is immediately performed, or may secure resources for data transmission to the corresponding UE before changing the UE to the connected state. The disclosure provides a method of changing a corresponding UE to a state of being connected to a mobile communication network in advance, based on a predetermined data transmission schedule, in the mobile communication network, or providing, to the UE, schedule information indicating when to change to a state of being connected to the network.

As another one of the CIoT services provided in the 5G mobile communication system, there may be supported a function of a UE for transmitting non-IP data to an AS via an NEF. This is Non-IP data delivery, which is abbreviated as "NIDD". Alternatively, there may be a reliable data service that provides a reliable data transmission service between a UE and an NEF, which is abbreviated as "RDS". As described above, in order to support a function of transmitting IoT small data via an NEF, the NEF and an SMF may need to establish a connection for data transmission or may need to exchange related information. According to the conventional method, a configuration associated with NIDD is performed between a 3rd party AS and an NEF. Subsequently, if a UE performs, with an SMF, establishment of a PDU session associated with the NIDD service, the SMF may perform activation of the NIDD service with the NEF. If the NIDD configuration is not performed in advance between the 3rd party AS and the NEF, information associated with the NIDD configuration is not present in a network. Accordingly, the SMF may not approve of the PDU session establishment procedure performed by the UE, and may refuse the corresponding request. Also, after the NIDD configuration is performed between the 3rd party AS and the NEF, the 3rd party AS may need to transmit an application-level signaling so that the UE can perform PDU session establishment for the NIDD service, or may need to perform device triggering using a 3GPP network. In order to transmit the application-level signaling before the UE establishes the PDU session for NIDD, a PDU session which is different from the PDU session for NIDD needs to be established. Also, the UE needs to support SMS in order to support device triggering. In other words, the limitation of the current system requires IoT UEs, which are developed simply with low-costs, to support additional functions. This may deteriorate activation of an IoT UE. In the case in which a UE establishes a PDU session for a "data transmission service via an NEF" in order to establish a connection between an SMF and an NEF in association with "supporting data transmission service via an NEF", the disclosure provides a procedure of completing a PDU session establishment procedure without NIDD configuration performed between a 3rd party AS and the NEF, and activating an NIDD service between an SMF and the NEF when the NIDD configuration is subsequently performed.

As another one of the CIoT functions used in the 5G mobile communication system, there may be a small data rate control function. According to the function, an IoT UE frequently transmits small data so as to prevent a network from being crowded. The number of data packets that a UE is capable of transmitting per hour or the amount of data that the UE is capable of transmitting per hour may be set for the network, and the value may be transferred to the UE. The UE that receives the value may restrict data transmission by itself based on the set value. However, the function is appropriate for a UE which uses a CIoT function, and may not need to be applied to a UE that uses broadband communication such as a smart phone or a tablet. Therefore, there is a desire for a method in which a network identifies the type of UE, and determines whether to apply a small data rate control function. This is provided in the disclosure.

Solution to Problem

In accordance with an aspect of the disclosure, a method of establishing a protocol data unit (PDU) session by a session management function (SMF) in a wireless communication system, may include: receiving, from an access management function (AMF), a first message including radio access technology (RAT) type information indicating an RAT that a user equipment (UE) currently accesses; determining whether to apply a small data rate control function to the UE based on the RAT type information; and transmitting, to the AMF, a second message including information associated with whether to apply the small data rate control function to the UE.

In this instance, the small data rate control function is a function of the UE for controlling transmission of small data based on a set value set in a network, and the set value may include at least one of the number of data packets that the UE is capable of transmitting per hour, and an amount of data that the UE is capable of transmitting per hour.

Protocol configuration options (PCO) including the set value may be configured, the PCO may be included in the second message and may be transmitted to the AMF, and the PCO may be included in a PDU session establishment accept message and may be transmitted to the UE.

The PDU session establishment method by the SMF may include: receiving, from a user data management (UDM), subscription information associated with the UE, wherein whether to apply the small data rate control function to the UE may be determined in consideration of the subscription information together with the RAT type information.

The RAT type information may indicate an RAT that the UE accesses among narrowband IoT (NB-IoT), wideband EUTRAN (WB-EUTRAN), new radio (NR), new radio IoT (NR-IoT), and UE for machine type communication (LTE-M).

In accordance with another aspect of the disclosure, a method of establishing a protocol data unit (PDU) session by a user equipment (UE) in a wireless communication system, may include: transmitting, to an access management function (AMF), a PDU session establishment request message including radio access technology (RAT) type information indicating an RAT that the UE currently accesses; receiving information which indicates whether to apply a small data rate control function to the UE, and is determined based on the RAT type information; and controlling a UE's transmission of small data according to a set value set in a network based on the information indicating whether to apply the small data rate control function to the UE.

In this instance, the set value may include at least one of a number of data packets that the UE is capable of transmitting per hour and an amount of data that the UE is capable of transmitting per hour.

The PDU session establishment method by the UE may further include: receiving a PDU session establishment accept message including protocol configuration options (PCO) associated with the set value.

In this instance, whether to apply the small data rate control function to the UE may be determined based on subscription information associated with the UE provided from a user data management (UDM), together with the RAT type information.

The RAT type information may indicate an RAT that the UE accesses among narrowband IoT (NB-IoT), wideband EUTRAN (WB-EUTRAN), new radio (NR), new radio (NR-IoT), and LTE for machine type communication (LTE-M).

In accordance with another aspect of the disclosure, a session management function (SMF) which establishes a protocol data unit (PDU) session in a wireless communication system, may include: a transceiver; and a controller configured to: perform control so as to receive, from an access management function (AMF), a first message including radio access technology (RAT) type information indicating an RAT that a user equipment (UE) currently accesses; determine whether to apply a small data rate control function to the UE based on the RAT type information; and perform control so as to transmit, to the AMF, a second message including information associated with whether to apply the small data rate control function to the UE.

In accordance with another aspect of the disclosure, a user equipment (UE) which establishes a protocol data unit (PDU) session in a wireless communication system, may include: a transceiver; and a controller configured to: perform control so as to transmit, to an access management function (AMF), a PDU session establishment request message including radio access technology (RAT) type information indicating an RAT that the UE currently accesses; perform control so as to receive information which indicates whether to apply a small data rate control function to the UE, and is determined based on the RAT type information; and control a UE's transmission of small data according to a set value set in a network based on the information indicating whether to apply the small data rate control function to the UE.

Advantageous Effects of Invention

According to the disclosure, a 5G system may support an operation of connecting a user equipment (UE) to a network at the time scheduled in a schedule in order to transmit data to the UE according to the schedule requested from a $3^{rd}$ party AS that provides an application service. Therefore, by only connecting to a 3GPP network, the UE wakes up at a predetermined time and connects to the network, without any additional operation of controlling the operation of the UE.

According to the disclosure, the 5G system may activate an NIDD service irrespective of the order of a PDU session establishment procedure and an NIDD configuration procedure, by removing the dependence between the PDU session establishment procedure performed by a UE for NIDD and the NIDD configuration procedure performed between a $3^{rd}$ party AS and an NEF.

Also, this may not need to support an application-level signaling or other additional functions to enable the UE to use the NIDD service. Also, this may not need to depend upon another function to enable the 5G system to support the NIDD service for the UE.

According to the disclosure, the 5G system may maintain a UE in a state of being connected to a network at a predetermined time, in order to support a mobile communication service sensitive to time (e.g., factory automation IoT).

According to the disclosure, the 5G system may determine a UE to which a CIoT function needs to be applied, and may determine to apply a small data rate control function to only the corresponding UE. Therefore, a UE that uses broadband mobile data such as a smart phone or a tablet may not be restricted by the small data rate control.

MODE FOR THE INVENTION

Figure 1:
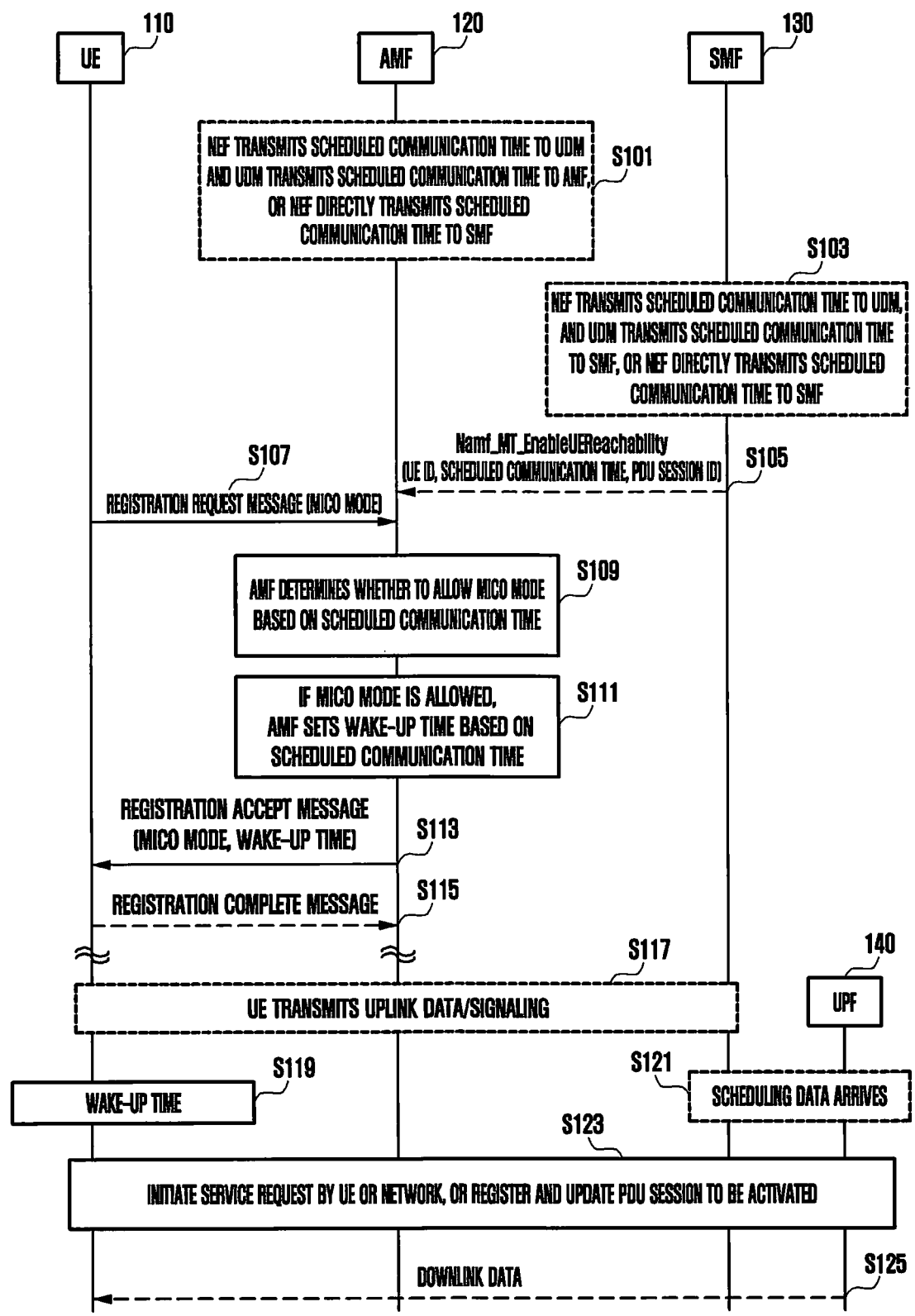
FIG. 1 is a diagram illustrating a method in which an AMF obtains schedule information associated with scheduled data transmission, and provides the corresponding time to a user equipment (UE), according to an embodiment of the disclosure.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Entities used in the disclosure are described below.

A user equipment (UE) is connected to a radio access network (RAN) and accesses a device, which performs a mobility management function, of a core network device of 5G. In the disclosure, this is referred to as an access and mobility management function (AMF). This may be a function or device that is in charge of both access to an RAN and mobility management of a UE.

An SMF is the name of a network function that performs a session management function. The AMF is connected to the session management function (SMF), and the AMF routes a session-related message associated with the UE to the SMF. The SMF connects to a user plane function (UPF), allocates a user plane resource to be provided to the UE, and establishes a tunnel between a base station (BS) and the UPF for data transmission.

An NRF, which is the abbreviation of a network repository function, stores information associated with NFs installed in a mobile communication operator network, and reports the information associated therewith. The NRF is connected to all NFs. Each NF performs registration on the NRF when operating in an operator network, and the NRF is aware that the corresponding NF is operating in the network.

An NEF, which is the abbreviation of a network exposure function, performs a function of exposing the internal function and service of the mobile communication operator network to the outside. Therefore, the NEF is connected to an external application server (AS), so that the NEF transfers, to the AS, an event or information occurring from an NF in the network, or transfers an event or information requested from the AS to an internal NF.

A UDR is the abbreviation of a user data repository, and performs the same function as that of a HSS of a 4G network. This may store subscription information of a UE or context that the UE uses in a network.

As the background technology of the disclosure, a function of supporting a CIoT service is as follows.

A function of data transmission via control plane signaling: An IoT UE transmits or receives a small amount of data and thus, establishing a user plane connection for a small amount of data transmission or reception is inefficient in terms of the use of radio resources, and is also inefficient in terms that signaling for user plane connection establishment always occurs.

Therefore, the technology of transmitting a small amount of data, which is transmitted from a UE for a CIoT service, via control plane signaling has been developed. According to the technology, a UE may include data desired to be transmitted in an SM-NAS message transmitted to an SMF, and may transmit the same. The SMF that receives the same may transfer the corresponding data to a destination NF, and support data transmission.

In the same manner, if data comes from the outside, a UPF or an NEF may report, to an SMF, that data directed toward a UE has arrived, and transfer the corresponding data to the SMF. The SMF that receives the same may include the corresponding data in an SM-NAS message transmitted to the UE, and transmit the same to the UE. For the data transmission as described above, a UE and an SMF need to establish a PDU session, and the PDU session is used for a data transmission function via control plane signaling. Therefore, in the case of establishment of a PDU session with the SMF, the UE may perform a procedure by including an indicator indicating a data transmission function via control plane signaling in the procedure.

A non-IP data transmission service via NEF: A 5G mobile communication network may transfer non-IP data, transmitted from a UE, to a $3^{rd}$ party AS via an NEF. The UE may include non-IP data in a NAS message to be transmitted to an SMF and transmit the same to the SMF, and the SMF may transmit the same to the NEF. The NEF may transmit the same to the AS. If the AS transmits data, the AS transmits non-IP data associated with the UE to the NEF, and the NEF may transmit the same to the SMF. The SMF may include the data in a NAS message and transmit the same to the UE.

That is, a data route is UE-AMF-SMF-NEF-AS. A process of providing a data transmission service to a predetermined UE and a predetermined AS via an NEF for the non-IP data transmission used for an IoT service, is referred to as an "NIDD service".

The non-IP data is a transmission protocol in any form that is different from an IP format. The non-IP data may be used in order to reduce the capacity of an IP header which is excessive compared to real data, and may be a protocol used for simple data transmission, such as a sensor network or the like. Also, since the UE transmits data to the AS via the NEF, a protocol between the UE and the NEF may be used. The protocol supports reliable data transmission between the UE and the NEF, and thus, it is referred to as a reliable data service, which is abbreviated as RDS.

In other words, a service that transmits data via an NEF is referred to as "NIDD" or "RDS" in the 3GPP standard, and may be called by other names. However, the function of performing data transmission via an NEF corresponds to a "service of transmitting data via an NEF" used in the disclosure, no matter what the name is. In the disclosure, the process of providing an NIDD service via an SMF is described.

Therefore, in order to use an NEF and an NIDD service, a UE may need to proceed with a PDU session establishment procedure with an SMF. The PDU session establishment procedure is a procedure performed between a UE and an SMF in association with a predetermined data network. If a PDU session is used for an NIDD service, the UE may perform a PDU session establishment procedure with an SMF by including an indicator corresponding to the NIDD service or a data network name associated with the NIDD service in the procedure.

A scheduled data transmission support service (scheduled downlink data communication service): A 5G mobile communication network may receive schedule information associated with a scheduled downlink data transmission time for a predetermined UE or group, from a $3^{rd}$ party AS. The $3^{rd}$ party AS is an application server that is present beyond the scope of 5G mobile communication network elements.

For example, in the case in which an industrial IoT supports data transmission using a 5G mobile communication system, an application server that operates for the industrial IoT service may be considered as a $3^{rd}$ party AS from the perspective of the 5G mobile communication system. The $3^{rd}$ party AS may provide schedule information or the time at which the UE needs to be available for data reception (i.e., the time at which the UE is reachable to the network, is capable of receiving paging, or needs to be in a connected state), to a 3GPP network via an "Expected UE Behaviour" Provisioning API via the NEF. The schedule information may include a plurality of pieces of schedule information. The plurality of pieces of schedule information may be, for example, 9 AM on Monday, 12 AM every day, 10 hours after the present time, 20 minutes after the present time, and the like.

The network that receives the same may perform configuration so that the network is capable of detecting the UE (reachable) at a scheduled communication time when the UE desires to use a power saving state (a state in which the UE is not reachable from the network in order to reduce the amount of power consumed, that is, a state in which the UE does not perform a network connection-related operation, such as a state of not monitoring a paging channel, or the like).

For example, by comparing the scheduled communication time and the time at which the UE periodically reports reachability to the network (e.g., a periodic registration update timer), the network may set a subsequent periodic registration update time to be appropriate for the scheduled communication time. As another example, if the scheduled communication time is before the subsequent periodic registration update time of the UE, the network does not allow the power saving function of the UE, so that the UE is reachable at the corresponding time.

Alternatively, in the case in which the UE uses an industrial IoT service, that is, in the case in which subscription information of the UE indicates that the UE is for the industrial IoT, or indicates that the UE uses a private network established for the industrial IoT, or the 5G network operates only for the industrial IoT, the 5G network that receives schedule information from the AS may determine that the corresponding UE is to use data communication sensitive to time.

Therefore, the 5G network may perform configuration so that the UE is ready for data transmission/reception at the time scheduled in the schedule information received from the AS. For example, based on the schedule information associated with data transmission, received from the AS, for example, 9 AM on Monday, 12 AM every day, 10 minutes after the present time, or the like, the 5G network may configure schedule information for the UE so that the UE changes to a connected state based on the corresponding schedule, or may perform paging of the UE so that the UE changes to a connected state immediately before the corresponding schedule.

FIG. 1 illustrates a method in which an AMF obtains schedule information associated with scheduled data transmission, and provides the corresponding time to a UE according to an embodiment of the disclosure.

A $3^{rd}$ party application server or an AS may set a scheduled communication time for a 5G network. The AS may transmit the same by directly transmitting a message to a UDM or an AMF, or may transmit the corresponding information to a UDM, an AMF, or an SMF via an NEF. The AS may configure the scheduled communication time as a plurality of pieces of schedules and may transmit the same.

For example, the AS may transmit a plurality of pieces of schedule information, such as 0:00 every day, 12:30 every day, or 20 minutes after the present time, or an absolute time value indicating a time after the present time (e.g., UTC 20:00 on Jul. 10, 2018), to the 5G network.

Referring to FIG. 1, the disclosure assumes that a scheduled communication time is stored in context associated with a user equipment (UE) 110 contained in a UDM, and an AMF 120 or an SMF 130 may obtain the scheduled communication time in operations S101 and S103.

Alternatively, an NEF directly transmits a scheduled communication time associated with a predetermined UE to the AMF 120 or SMF 130, so that the AMF 120 or the SMF 130 may obtain the corresponding value, in operations S101 and S103 of FIG. 1. The UDM may classify the corresponding information obtained from the NEF as session management context, and may store the same.

A scheduled communication time is provided in association with a predetermined UE indicated by an external ID or an external group ID, from a $3^{rd}$ party to the UDM. Accordingly, the UDM may store a scheduled communication time value for each external ID or external group ID of a UE, in an SM context. This is because the UE has many external IDs or external group IDs. Alternatively, a scheduled communication time may be provided from a $3^{rd}$ party to the UDM as a value associated with a predetermined data network name (DNN) for a predetermined UE indicated by an external ID or an external group ID. In this instance, the UDM may store, in the SM context, a scheduled communication time value based on a DNN value for each external ID or external group ID of the UE. This is to support the case in which the UE has many external IDs or external group IDs, or the case in which subscriber information is set so that the UE is capable of using many DNNs for an NIDD service.

That is, a scheduled communication time is configured for each UE in the subscriber information in the UDM, and a plurality of pieces of scheduled communication time information may be configured for each external ID or external group ID, or for each external ID or external group ID and each DNN.

Operation S105 is a subsequent operation performed after the SMF 130 obtains the scheduled communication time as SM context associated with the UE 110 from the UDM, or after the SMF 130 obtains the scheduled communication time from the NEF. The SMF 130 may determine when downlink data transmission to the corresponding UE 110 is to be performed, based on the scheduled communication time. Since the UE 110 needs to be reachable by the 5G network at the corresponding time, the SMF 130 may transmit a message that requests reachability of the UE 110 to the AMF 120 that is in charge of the mobility management of the UE. Any message may be used as the message in the disclosure, if the message is one of the APIs provided by the AMF 120, and includes a meaning that the SMF 130 requests the AMF 120 to enable reachability of a predetermined UE at a scheduled communication time although the name of message is different from the message of operation S105.

In operation S105, the SMF 130 may include an ID of the UE 110 (an ID that enables the AMF to identify a UE, for example, a subscription concealed identifier (SUCI) or a subscription permanent identifier (SUPI) (the former IMSI), or an external ID), may include a scheduled communication time obtained in operation S103, and may include a PDU session ID indicating the corresponding PDU session. The reason why the PDU session ID is included is that the UE 110 needs to determine a PDU session to activate when the UE 110 transmits a service request at a scheduled communication time and wakes up if the UE 110 performs data communication using many PDU sessions. Also, if the UE performs data communication using many PDU sessions, the AMF 120 may need to identify a PDU session associated with the scheduled communication time. If the AMF 120 receives many scheduled communication time values from many SMFs or a single SMF, the AMF 120 may use the PDU session ID included in the message of operation S105, so as to identify a scheduled communication time value for each PDU session.

The AMF 120 that receives the message of operation S105 or the AMF 120 that identifies a scheduled communication time associated with the UE 110 via operation S101, may store the corresponding information in the context of the UE 110. If the UE 110 requests an operation of leaving a state of being reachable to the network during a predetermined period of time in order to reduce the amount of power consumed, the AMF 120 may enable the UE 110 to wake up at a predetermined time and to be reachable by the network using the scheduled communication time value. Alternatively, if the UE 110 uses time-sensitive data communication, the AMF 120 may enable the UE 110 to change to a state of being connected to the network at the time scheduled in the schedule information, based on the scheduled communication time value.

The UE 110 may suspend an operation of monitoring a paging channel (e.g., MICO mode, PSM in 4G system) or monitoring a paging channel only at a predetermined time (e.g., IDLE mode DRX), in order to reduce the amount of power consumed. To this end, the UE 110 may negotiate with the AMF 120, and the negotiation may be performed via a registration procedure.

In operation S107, the UE 110 negotiates the use of a MICO mode. However, this may inclusively include the use of other functions for which the UE 110 needs to negotiate with the AMF 120, in order to reduce the amount of power consumed. For example, there may be 5G Power Saving Mode, 5G DRX, 5G Extended DRX, and the like.

For ease of description, a description will be provided with reference to a MICO mode. A MICO mode is a mode in which, when the UE 110 changes to an IDLE mode, the UE does not monitor all paging channels any longer and the UE 110 is not detectable in the 5G network. That is, the MICO mode is a mode in which the UE 110 changes to an unreachable state. If the UE 110 needs to transmit data or signaling, the UE 110 may wake up at a periodic registration update time set by the network and may access the 5G network again. Therefore, the network cannot wake up the UE 110 until a registration procedure occurs, which the UE 110 performs at periodic set times. The UE 110 may include an indicator indicating that the UE is to use a MICO mode in a registration request procedure of operation S107.

In addition to the negotiation with the AMF 120 in order to reduce the amount of power consumed, operation S107 may be a registration procedure performed based on the mobility of the UE 110 or may be a registration procedure performed at periodic times. Also, the operation may be a registration procedure that the UE 110 performs in order to synchronize with the network. The operation may include all cases in which the UE 110 performs a registration procedure with the AMF 120 under other conditions.

In operation S109, the AMF 120 may determine whether to allow the MICO mode for the UE 110. If the scheduled communication time value for the UE 110 will come soon, the AMF 120 may not allow the MICO mode for the UE 110 so that the UE 110 does not enter the MICO mode and continuously stays in a reachable state.

If the scheduled communication time value for the UE 110 will come a sufficient amount of time after the UE 110 enters the MICO mode, the AMF 120 may allow the MICO mode so that the UE 110 is capable of entering the MICO mode and reducing the amount of power consumed. Alternatively, if the UE 110 uses time-sensitive data communication, operation S109 may be omitted. If time-sensitive data communication is used, a function of reducing the amount of power consumed may not be used. Therefore, the AMF 120 does not determine whether to allow the MICO mode, and may perform operation S111 with respect to the UE 110.

In operation S111 according to an embodiment of the disclosure, the AMF 120 may set a wake-up time for the UE 110 for which the MICO mode is to be allowed. Alternatively, the AMF 120 may set a wake-up time for a normal UE that does not use the MICO mode, or a UE that uses time-sensitive data communication. The wake-up time may be set based on the scheduled communication time value, and the AMF 120 may set a value indicating a time slightly ahead of the scheduled communication time. Through the above, a latency that may occur when the UE 110 accesses the network is taken into consideration. The wake-up time provided to the UE 110 may be expressed as an absolute time. For example, the wake-up time may be expressed as universal coordinated time (UTC). The time value may be set as year/month/day/minute. Alternatively, the wake-up time may be expressed as a value corresponding to the time zone of the network that the UE currently accesses.

For example, if it is Korea, the wake-up time may be expressed as KST and the time value may be set as year/month/day/minute. Together with the wake-up time, an indicator indicating whether the corresponding time is based on UTC or the time zone at which the UE currently accesses the network, may be included. The UE may distinguish the same, and may properly apply another time zone if the UE moves to a country that belongs to a different time zone. For example, in the case in which the UE moves from Korea to China, the UE may use the same value if UTC is used. However, if the UE receives a value corresponding to KST, the UE needs to change the value to CST which corresponds to the standard time of China. The wake-up time is not limited by the name, and may be information that is provided from the AMF and indicates the time at which the UE needs to be reachable by the network. In other words, the wake-up time is information indicating the time at which the UE needs to change to a state of monitoring a paging channel, or the UE needs to change to a connected state by performing a service request or registration update procedure or the like with the network.

The wake-up time may include a plurality of pieces of schedule information. For example, a plurality of pieces of schedule information expressed as absolute time values, such as 13:00 on Y day X month, at 9:00 on X day X month, and the like, may be included. As another example, a plurality of pieces of schedule information that are not expressed as absolute time values, such as at 9 o'clock every day, at 0 AM on Mondays, or z minutes after the current time, and the like, may be included.

In operation S113, the AMF 120 may transmit, to the UE 110, the wake-up time determined in operation S111 together with an indicator indicating that the MICO mode is allowed. In the case of a UE that uses time-sensitive data communication, the AMF 120 may transmit the wake-up time determined in operation S111, irrespective of whether the MICO mode is allowed. The UE 110 that receives the same may determine that the UE itself needs to be reachable by the network, may transmit a service request in order to change to a connected state, or may determine to perform a registration update procedure.

A modem of the UE 110 continuously stores the time information, and may perform a predetermined operation when the corresponding time arrives. A time value indicating a time that has elapsed is not valid any longer. If the UE 110 receives time values associated with a plurality of schedules, the UE 110 may determine that a time value indicating a time that has elapsed is invalid, may determine that a time value indicating a time that has not arrived yet is valid information, and may check whether the corresponding time arrives.

In operation S115, the UE 110 reports the completion of the registration procedure. This may be performed when an ID (e.g., 5G-GUTI) or the like associated with the UE 110 is newly allocated, or may be omitted in order to simplify the procedure.

Upon completion of the registration procedure, the UE 110 that is allowed to operate in the MICO mode may change to an IDLE state, and operate in the MICO mode. While the UE 110 is operating in the MICO mode, the network is not capable of paging the UE 110. If the UE 110 operates in a long DRX cycle, instead of operating in the MICO mode, the network is incapable of paging the UE 110 while the UE 110 is operating in a DRX sleep cycle. However, if the UE has data or signaling to transmit to the network, the UE 110 may wake up any time and may communicate with the network. This operation may not affect the wake-up time value.

However, if a scheduled communication time value newly set for the AMF 120 is present while operation S117 is performed, the AMF 120 may update the wake-up time for the UE 110. Via a registration procedure or a UE configuration update procedure, the AMF 120 may transmit a new wake-up time to the UE 110, and the UE 110 may replace the existing value with the newly received wake-up time value. The above-mentioned content is related to an exceptional processing, and is not illustrated in the drawings of the disclosure, but may occur during the process of operation S117.

According to an embodiment of the disclosure, the UE 110 may wake up to be reachable by the network at the time corresponding to the set wake-up time. A modem of the UE 110 continuously stores the time information, and may perform a predetermined operation when the corresponding time arrives. A time value indicating a time that has elapsed is not valid any longer. If the UE 110 receives time values associated with a plurality of schedules, the UE 110 determines that a time value indicating a time that has elapsed is invalid, determines that a time value indicating a time that has not arrived yet is valid information, and checks whether the corresponding time arrives.

Operations that the UE 110 performs to be reachable by the network may be two operations as follows. First, the UE 110 transmits a service request or a registration request to the AMF 120. The UE 110 may wake up and access the network, and may transmit a service request or a registration request in order to change to a connected state. The AMF 120 that receives the same may change the UE 110 to a connected state, and may trigger the corresponding SMF 130 appropriate for a PDU session in which a scheduled communication time is set or a DNN, so as to activate the user plane of the UE 110 or the data path of the UE, and thus, scheduled downlink data transmission is performed.

Second, the UE 110 enables an operation of listening to a paging channel. Since scheduled downlink communication is planned, if downlink data with respect to the UE 110 is received at the corresponding time, the AMF 120 may perform paging of the UE 110. Therefore, the UE 110 monitors a paging channel during a predetermined period of time from the wake-up time, and if downlink data arrives at the scheduled time, the UE 110 receives paging from the AMF 120 and transmits a service request. If paging is not present during a predetermined period of time, the UE returns to a power saving state again. In this instance, the UE 110 maintains a CM-IDLE state. The predetermined period of time is based on a set value basically set for the UE 110. Alternatively, the AMF 120 may transmit information associated with a period of time during which the UE 110 needs to listen to a paging channel to the UE 110 in operation S113, and the UE 110 may perform operation based on the information.

Operation S121 indicates that downlink data is received at the scheduled communication time, as scheduled. The UPF 140 receives the downlink data from the data network, reports the same to the SMF 130, and activates the data path for transmitting data to the UE 110. This process is performed in operation S123 in response to an NW-initiated service request. In response to the NW-initiated service request, the network performs paging of the UE 110, and the UE that wakes up transmits a service request and the UE 110 changes to a connected state.

Alternatively, if the UE 110 transmits a service request first in operation S123, the AMF 120 determines an SMF that sets a scheduled communication time that matches the corresponding time, triggers the corresponding SMF 130 in order to activate a data path, and transmit downlink data via an activated PDU session. Alternatively, if the UE 110 transmits a registration request in operation S123, the AMF 120 maintains the connection of the UE 110 during a predetermined period of time until a downlink data notification associated with the UE 110 is received. If the UE 110 returns to an idle state, the UE 110 becomes unreachable.

If downlink data for the UE 110 arrives while the connection of the UE 110 is maintained, and the SMF 130 reports that a data path associated with the UE 110 needs to be activated to the AMF 120, the AMF 120 may perform a procedure of activating the corresponding data path. As another example, in operation S123, the UE 110 may include information associated with a PDU session of which a data path is to be activated in "PDU session to be activated" together with a registration request, the AMF 120 that receives the same may trigger the SMF 130 associated with the corresponding PDU session to activate the data path. After the data path for transmitting data to the UE is activated via the three operations, the data is transmitted to the UE in operation S125.

As another example of FIG. 1, although not illustrated, the UE 110 may request long DRX, unlike the MICO mode or other power saving modes, in operation S107. In consideration of a long DRX cycle that the UE 110 desires, if the AMF 130 determines that the time at which the UE 110 is to wake up comes after a scheduled communication time, the AMF 130 may set a DRX cycle of the UE 110 such that the UE 110 wakes up at the time corresponding to the scheduled communication time, and may transmit the same to the UE 110. The UE 110 may perform operation according to the DRX cycle that the AMF 120 provides.

As another example of FIG. 1, the AMF 120 that receives a scheduled communication time in operation S101 or S105 may perform the following operations, instead of configuring a wake-up time for the UE 110. The AMF 120 may determine the time at which the UE 110 is to be in a state of being connected to the network, based on the scheduled communication time. The AS starts data transmission to the UE 110 according to the scheduled communication time. In this instance, the UE 110 needs to be in the state of being connected to the network so that downlink data produced at a scheduled time is transferred without latency. Generally, if downlink data is produced for the UE 110 in an idle state, the AS performs paging of the UE 110 so as to change the UE 110 to an idle state to a connected state, and allocates, to the UE 110, resources for data transmission or reception. However, if the UE 110 is already in the connected state before downlink data is produced, and the corresponding UE 110 receives resources allocated in association with a PDU session in which data is to be transmitted at the scheduled communication time, data transmission may be immediately performed without latency caused by the idle-to-connected state change operation, when downlink data is produced. Therefore, this is appropriate for providing a low-latency communication service to the UE 110.

The AMF 120 identifies the received scheduled communication time and transmits paging to the UE 110 before the corresponding time arrives, so that the UE 110 accesses the network and changes to a Connected state. The AMF 120 may expect that downlink data transmission with respect to the UE 110 is to be performed at the scheduled communication time. In operation S105, the AMF 120 that receives the scheduled communication time determines a PDU session in which downlink data transmission is to be performed, based on a PDU session ID corresponding to the scheduled communication time. If a plurality of pieces of scheduled communication time information are present for a plurality of PDU sessions, the AMF 120 may determine to simultaneously activate PDU sessions having similar scheduled communication time values.

Based on the determination, the AMF 120 may transmit paging in order to wake up the UE 110. The AMF 120 may transmit a paging message to the UE 110 before the scheduled communication time, for example, several seconds ahead of the scheduled communication time, or may calculate the amount of time during which the UE 110 normally stays in a connected state and may transmit a paging message within the calculated time before the time set for the scheduled communication time (e.g., if the UE maintains a connected state during normally one minute, one minute or less ahead of a scheduled communication time value).

If the UEs 110 for which a scheduled communication time is set at or about (e.g., within several seconds around) a predetermined scheduled communication time are present among UEs that the AMF 120 manages, the AMF 120 may sequentially perform paging of the UEs 110 in order to prevent the corresponding UEs from waking up at once via paging and accessing the network. This may prevent the network from being crowded when a large number of UEs simultaneously attempt network access at a predetermined point in time. In other words, if 100 UEs need to wake up at a predetermined scheduled communication time, paging is not transmitted to 100 UEs at one time, but paging is sequentially transmitted at regular intervals to several UEs, a dozen UEs, dozens of UEs, or the like. The regular interval is based on a value set in the AMF. A UE that receives paging transmits a service request message to the network, and starts to change to a connected state. The AMF 120 that receives the service request transmitted from the UE 110 may identify a PDU session ID for which a scheduled communication time is set in association with the corresponding UE around the corresponding time, and may start a PDU session activation procedure with respect to the SMF 130 corresponding to the corresponding PDU session ID. If multiple PDU session IDs for which a scheduled communication time is set around the time at which the UE 110 transmits the service request are present, the AMF 120 may start the PDU session activation procedure with respect to all SMFs corresponding to the PDU session IDs.

The procedure may be a service operation named "Nsmf_PDUSession_UpdateSMContext_Request". Alternatively, the procedure may be a message called by another name which the AMF transmits to an SMF for PDU session activation. The SMF 130 that receives the message may select the UPF 140 for PDU session activation, and may perform an operation of establishing a tunnel between a base station and the UPF 140. Subsequently, a message for resource allocation is transmitted to the base station, and the base station allocates radio resources associated with the corresponding PDU session to the UE 110. All the operations may be performed before the scheduled communication time, and data transmission is performed in the previously PDU session when the scheduled communication time arrives. If the scheduled communication time arrives while operation is performed in response to the service request, the AMF and the SMF may perform the above-mentioned operations as they are.

Alternatively, if a scheduled communication time for a predetermined session is not set, the AMF 120 that receives a scheduled communication time in operation S101 may perform operations as follows. The AMF 120 may fail to identify a scheduled communication time associated with a predetermined PDU session. Accordingly, the UE 110 may perform an operation that enables the UE 110 to be in a state of being connected to a network at the set scheduled communication time. Accordingly, the AMF 120 may transmit paging in order to wake up the UE 110.

The AMF 120 may transmit a paging message to the UE 110 before the scheduled communication time, for example, several seconds ahead of the scheduled communication time, or may calculate the amount of time during which the UE 110 normally stays in a connected state and may transmit a paging message within the calculated time before the time set for the scheduled communication time (e.g., if the UE maintains a connected state normally during one minute, one minute or less ahead of a scheduled communication time value).

If UEs for which a scheduled communication time is set at or about (e.g., within several seconds around) a predetermined scheduled time are present among the UEs that the AMF 120 manages, the AMF 120 may sequentially perform paging of the corresponding UEs 110 in order to prevent the corresponding UEs from waking up at once via paging and accessing the network. This may prevent the network from being crowded when a large number of UEs simultaneously attempt network access. In other words, if 100 UEs need to wake up at a predetermined scheduled communication time, paging is not transmitted to 100 UEs at one time, but paging is sequentially transmitted at regular intervals to several UEs, a dozen UEs, dozens of UEs, or the like. The regular interval is based on a value set in the AMF. The UE 110 that receives paging transmits a service request to the AMF 120, and changes to a state of being connected to the network. The AMF 120 that receives the service request transmitted from the UE 110 may perform one of the two following operations.

First, the AMF 120 that determines that the UE 110 is a UE that supports low-latency communication may start a PDU session activation procedure with respect to all PDU session contexts stored in the context of the UE 110. That is, the AMF 120 may start a service operation for PDU session activation with respect to all PDU sessions that were established by the UE 110 but were changed to be deactivated when the UE changed to an idle state.

Accordingly, the AMF 120 may transmit a message for PDU session activation to the SMF 130 that serves a corresponding session, with respect to all PDU sessions included in the context of the UE 110. This may be a service operation such as Nsmf_PDUSession_UpdateSMContext_Requst. The SMF 130 that receives the same may perform a PDU session activation procedure with a UPF and a base station, and resources for the corresponding PDU session are allocated to the UE 110.

Since downlink data is to be produced for one of the PDU sessions that the UE 110 has, at a scheduled communication time, and resources for the corresponding PDU session have been already allocated, the UE 110 may immediately receive the data. The operation corresponding to "first" may reduce latency caused by an operation of paging of the UE 110, and an operation in which the UE 110 transmits a service request in response thereto, changes to a state of being connected to a network, and performs a PDU session activation procedure of the corresponding UE. That is, since all the PDU sessions are activated before downlink data is produced, the data may be immediately transmitted without latency associated with a PDU session activation process, when the downlink data for the UE 110 is produced.

Second, the AMF 120 may maintain a state in which the UE 110 has a control plane connection established with the AMF 120, without an activated PDU session. That is, in the state in which the UE 110 has a control plane connection established with the AMF 120 by transmitting a service request, the AMF 120 may continuously maintain the UE 110 in a connected state without performing a PDU session activation procedure. When a scheduled communication time arrives, downlink data may be transmitted to the UE 110, and the data may be transmitted first to a UPF that serves a PDU session corresponding to the UE 110.

The UPF 140 may report that downlink data for the corresponding UE arrives, to an SMF associated with the corresponding PDU session. The SMF 130 that receives the same may perform a PDU session activation procedure with the UPF 140 and the base station, and resources for the corresponding PDU session are allocated to the UE 110. After the PDU session activation procedure, the downlink data may be transferred to the UE 110. The operation corresponding to "second" may achieve low latency by removing a procedure in which the AMF 120 performs paging of the UE 110 and the UE 110 wakes up via a service request. However, latency caused by a procedure of establishing a PDU session may be inevitable.

Figure 2:
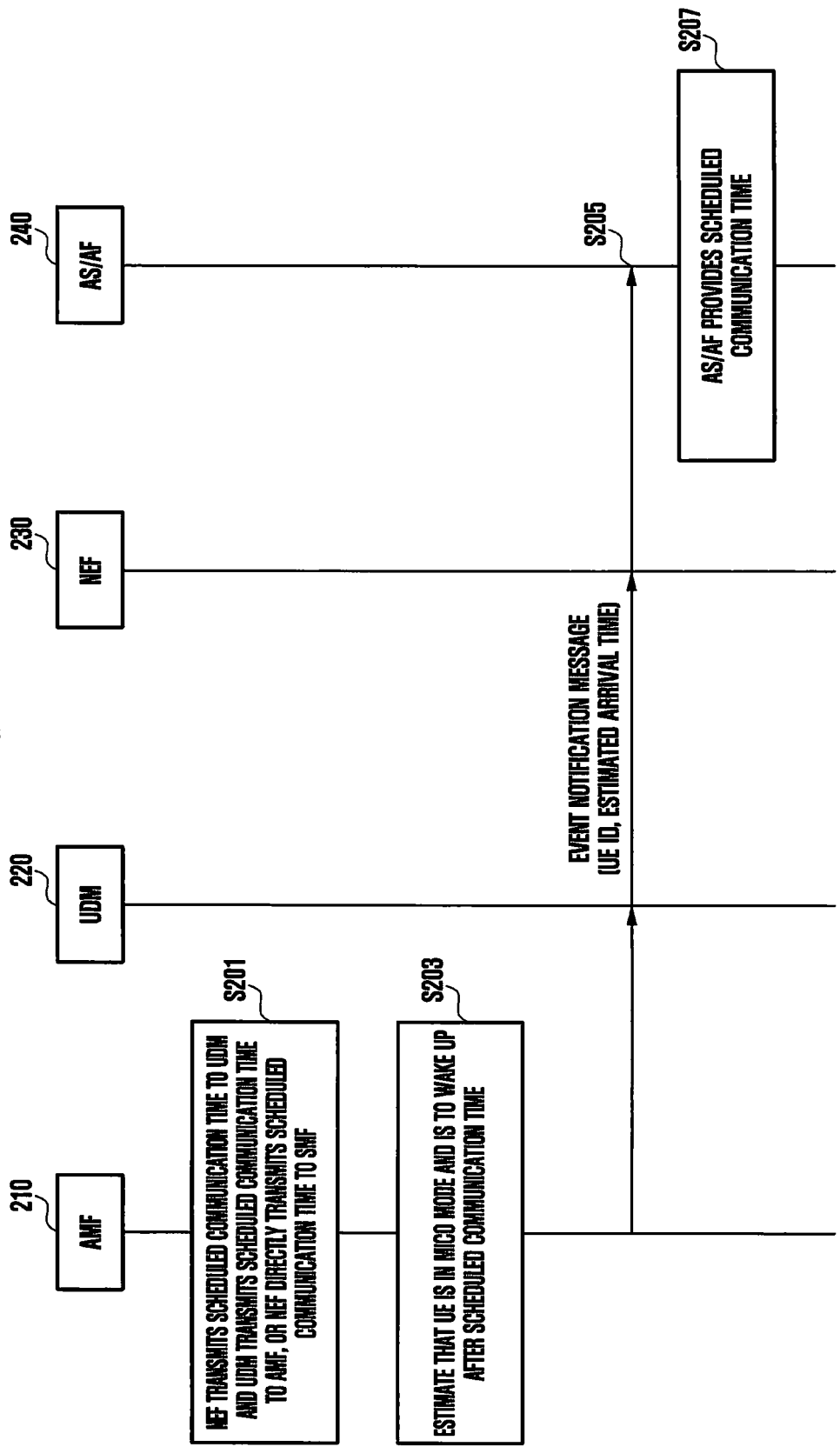
FIG. 2 is a diagram illustrating the operation performed when a UE is already in a state of not being reachable, in the case in which an AMF obtains schedule information associated with scheduled data transmission, according to an embodiment of the disclosure.

FIG. 2 is a diagram illustrating the operation performed when a UE is already in a state of not being reachable, in the case in which an AMF obtains schedule information associated with scheduled data transmission, according to an embodiment of the disclosure.

According to the embodiment of the disclosure of FIG. 2, an AMF 210 may be incapable of enabling a UE to be reachable at a scheduled communication time, in the case in which the UE is in a low-power mode and is unreachable by a network (e.g., MICO mode) although a $3^{rd}$ party AS 240 sets the scheduled communication time for the UE.

For example, if the time corresponding to the scheduled communication time is earlier than the time at which the UE is expected to wake up, the AMF 210 may not affirm whether the UE wakes up before the scheduled communication time. Therefore, the AMF 210 may not guarantee reachability of the UE, and may transfer information associated with the time at which the UE is expected to be reachable, to the $3^{rd}$ party AS via the 5G system.

Referring to FIG. 2, in operation S201, the AMF 210 already has a scheduled communication time. The information may be included in UE context transferred from a UDM 220, or may be information directly transferred from an NEF 230.

In operation S203, the AMF 210 may determine that the UE is already in a MICO mode, and more accurately, in a state of being unreachable by the network due to a low-power mode. Also, the AMF 210 may determine when the UE is to be reachable based on a periodic registration update timer set for the UE.

If the time corresponding to the scheduled communication time is earlier than the time at which the UE is expected to wake up, the AMF 210 may not affirm whether the UE wakes up at or before the scheduled communication time. Therefore, the AMF 210 may not configure the UE based on the scheduled communication time. The AMF 210 may proceed with operation S205 in order to report the above-mentioned information to the $3^{rd}$ party AS 240.

In operation S205, the AMF 210 may transfer information indicating that the UE is currently unreachable and time information associated with when the UE is expected to be reachable, to the NEF 230 via the UDM 220. Alternatively, the AMF 210 may directly transfer, to the NEF 230, information indicating that the UE is currently unreachable and time information associated with the time at which the UE is expected to be reachable.

The AMF 210 may be aware of an NEF from which the information is received in operation S201, and thus, may transfer the above-mentioned information to the corresponding NEF. The information of operation S205 may include a UE ID (e.g., an external ID) and the time at which the UE is expected to be reachable. The time at which the UE is expected to be reachable is determined based on the periodic registration update timer. The UE may wake up at the time corresponding to the periodic registration update timer.

The NEF 230 may report the received information to the $3^{rd}$ party AS 240. In operation S207, the $3^{rd}$ party AS 240 identifies that data transmission is not allowed at a desired time, and may set a scheduled communication time again to be appropriate for the time at which the UE is expected to be reachable, reported from the 5G system.

Figure 3:
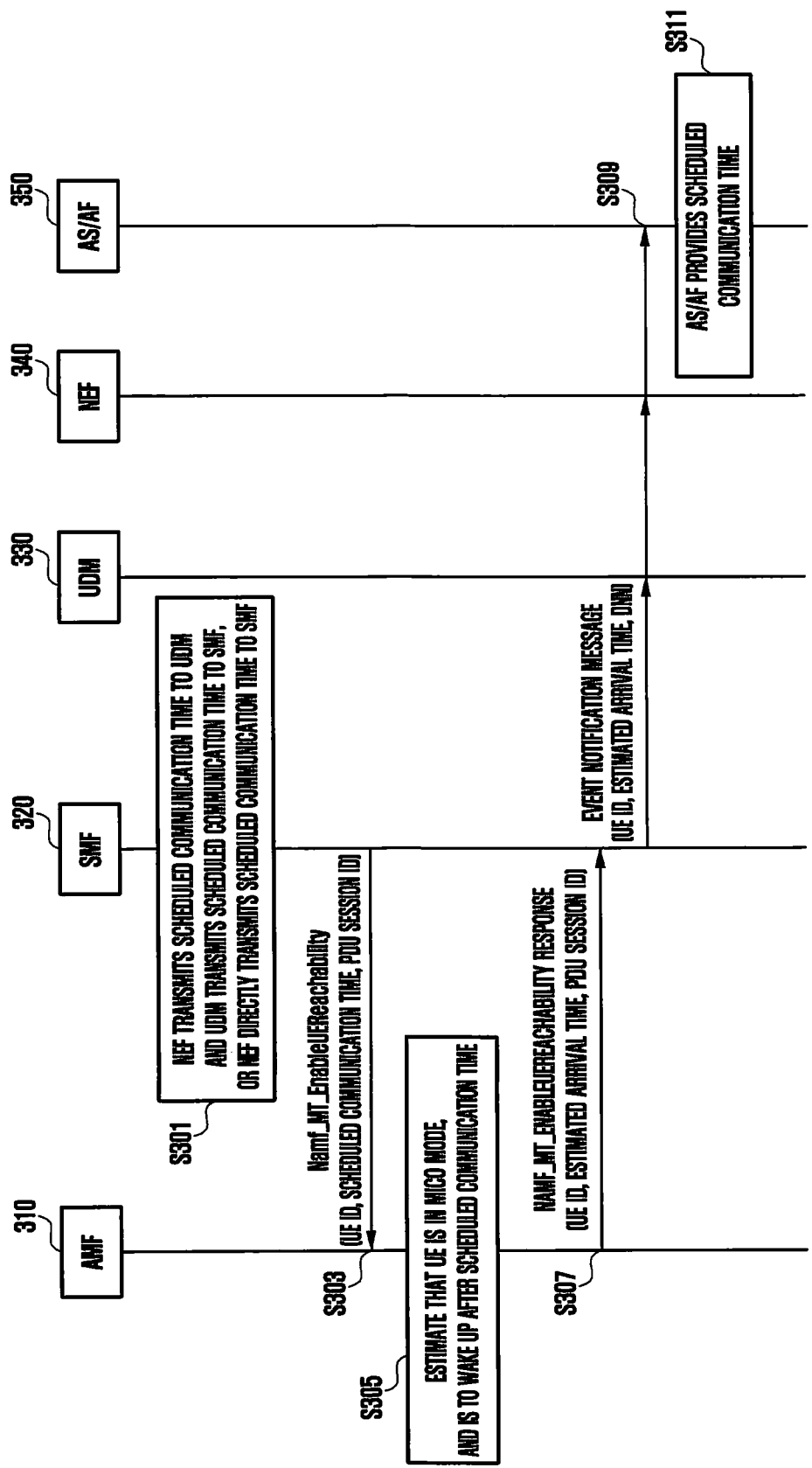
FIG. 3 is a diagram illustrating the operation performed when a UE is already in a state of not being reachable, in the case in which an SMF provides schedule information associated with scheduled data transmission to an AMF, according to an embodiment of the disclosure.

FIG. 3 is a diagram illustrating the operation performed when a UE is already in a state of not being reachable, in the case in which an SMF provides schedule information associated with scheduled data transmission to an AMF, according to an embodiment of the disclosure.

According to the embodiment of the disclosure of FIG. 3, an AMF 310 may be incapable of enabling a UE to be reachable at a scheduled communication time, in the case in which the UE is in a low-power mode and is unreachable by a network (e.g., MICO mode) although a $3^{rd}$ party AS 350 sets the scheduled communication time for the UE.

For example, if the time corresponding to the scheduled communication time is earlier than the time at which the UE is expected to wake up, the AMF 310 may not affirm whether the UE wakes up before the scheduled communication time. Therefore, the AMF 310 may not guarantee reachability of the UE, and may transfer, to an SMF 320, the time at which the UE is expected to be reachable. The SMF 320 may transfer the information received from the AMF 310 to the $3^{rd}$ party AS via the 5G system.

Referring to FIG. 3, in operation S301, the SMF 320 already has a scheduled communication time. The information may be included in UE context transferred from a UDM 330, or may be information directly transferred from an NEF 340.

In operation S303, the SMF 320 may provide, to the AMF 310, information indicating that a predetermined UE needs to be reachable at the scheduled communication time. This operation is based on operation S105 of FIG. 1 of the disclosure. The AMF 310, which receives the message of operation S303, may determine that the UE is already in a MICO mode, and more accurately, in a state of being unreachable by the network due to a low-power mode. Also, the AMF 210 may determine the time at which the UE is to be reachable based on a periodic registration update timer set for the UE.

If the time corresponding to the scheduled communication time is earlier than the time at which the UE is expected to wake up, the AMF 310 may not affirm whether the UE wakes up at or before the scheduled communication time. Therefore, the AMF 310 may not configure the UE based on the scheduled communication time. The AMF 310 may proceed with operation S307 in order to report the information to the SMF 320.

The message in operation S307 may include a UE ID, the time at which the UE is expected to wake up, or a PDU session ID of the corresponding UE. The time at which the UE is expected to be reachable is determined based on the periodic registration update timer. The UE may wake up at the time corresponding to the periodic registration update timer.

The SMF 320 may proceed with operation S309 in order to report the information to the $3^{rd}$ party AS 350. The SMF 320 may transfer information indicating that the UE is currently unreachable and time information associated with when the UE is expected to be reachable, to the NEF 340 via the UDM 330. Alternatively, the SMF 320 may directly transfer, to the NEF 340, information indicating that the UE is currently unreachable and time information associated with when the UE is expected to be reachable.

The SMF 320 may be aware of an NEF from which the information is received in operation S301, and thus, may transfer the above-mentioned information to the corresponding NEF. The information in operation S309 may include a UE ID (e.g., an external ID) and the time at which the UE is expected to be reachable (which may be determined based on a periodic registration update timer).

The NEF 340 may report the received information to the $3^{rd}$ party AS 350. The $3^{rd}$ party AS 350, which receives the message of operation S309, may identify that data transmission is not allowed at a desired time, and may set a scheduled communication time again to be appropriate for the time at which the UE is expected to be reachable, reported from the 5G system, in operation S311.

Figure 4:
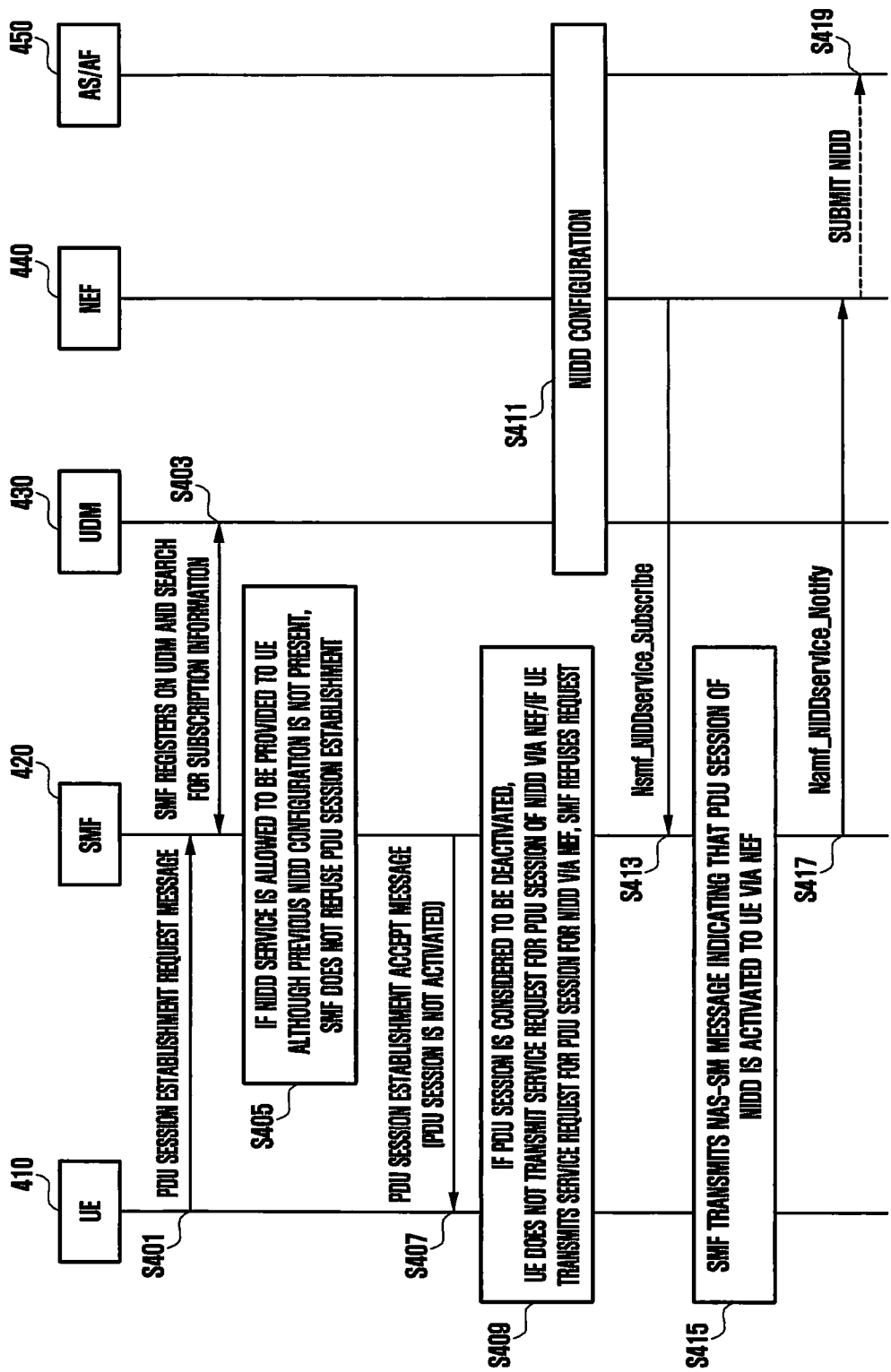
FIG. 4 is a diagram illustrating a method in which, when a UE and an SMF perform establishment of a PDU session in association with NIDD, the SMF identifies the absence of NIDD configuration and allows a corresponding PDU session establishment request but performs deactivation according to an embodiment of the disclosure.

FIG. 4 is a diagram illustrating a method in which, when a UE and an SMF perform establishment of a PDU session for NIDD, the SMF identifies the absence of NIDD configuration, and allows a corresponding PDU session establishment request but performs deactivation according to an embodiment of the disclosure.

An NEF 440 and an AS 450 may perform a configuration procedure in order to use a data transmission service via an NEF, which is background technology of the embodiments. In the disclosure, this is referred to as NIDD configuration. The AS 450 and the NEF 440 may configure that "data transmission service via an NEF" (hereinafter referred to as "NIDD service") is to be used for a UE or a group of UEs. The UE is indicated by an external ID. The external ID is an identification used for the AS 450 to identify the UE, and may identify an internal ID (e.g., an SUCI, an SUPI, an IMSI, or the like) for identifying a UE in the 5G system.

The group of UEs may be indicated by an external group ID. The external group ID is an identification used for the AS 450 to identify a group of predetermined UEs, and may identify an internal group ID for identifying a group of UEs or an internal ID of each UE included in the group in the 5G system. Via the NIDD configuration procedure performed between the NEF 440 and the AS 450, data transmission characteristics that the corresponding UE or group has, for example, maximum latency, the number of messages transmitted, a scheduled transmission time, a data transmission period of the UE, and the like may be set.

As another background technology, there is a need for a procedure of establishing a connection between the SMF 420 and the NEF 440 for the NIDD service. The SMF 420 needs to identify an NEF to which data obtained from the UE is to be transmitted, and the NEF 440 needs to identify an SMF to which data obtained from the $3^{rd}$ party AS 450 is to be transmitted in order to perform data transmission to the UE 410.

Therefore, the SMF 420 and the NEF 440 need to perform a connection procedure for the NIDD service, which is referred to as "NIDD service activation" for ease of description. As another example, data transmission may be performed via a connection between a UPF and the NEF 440 for the NIDD service. The connection between the UPF and the NEF 440 may be established via arbitration by the SMF. Therefore, in the case in which the NIDD service is supported via the connection between a UPF and an NEF, the SMF 420 and the NEF 440 may perform a connection procedure for the NIDD service, and the SMF 420 may configure related data routing information for the UPF, and needs to establish the connection between the UPF and the NEF 440. The NIDD service activation may be a procedure applied to the two cases, that is, the case in which data transmission is performed via the connection between the SMF 420 and the NEF 440, and the case in which data transmission is performed via the connection between the UPF and the NEF 440.

As another background technology, the UE 410 needs to establish a PDU session for the data transmission service via the NEF 440 (hereinafter referred to as the NIDD service), in order to transmit non-IP data via the NEF 440. The UE 410 performs a PDU session establishment procedure with the SMF 420, in order to establish a PDU session. In this instance, the UE 410 may include an identification indicating a PDU session for the NIDD service in the procedure. The identification may be an independent identification or a data network name (DNN) when the corresponding DNN has a value indicating the NIDD service.

The problems that the disclosure desire to solve are as follows. According to the conventional method, after an NIDD configuration procedure is performed between the $3^{rd}$ party AS 450 and the NEF 440, the UE 410 performs a PDU session establishment procedure associated with the corresponding NIDD service with the SMF 420. Then, the SMF 420 identifies NIDD configuration information included in subscription data of the UE 410 obtained from the UDM 430, and may perform an NIDD service activation procedure with an NEF indicated by the corresponding information.

If the NIDD configuration is not performed in advance between the $3^{rd}$ party AS 450 and the NEF 440, the NIDD configuration information is not present in the subscription data of the UE 410, and thus, the SMF 420 may not be aware of an NEF to which the connection is to be established for the NIDD service. Therefore, the SMF 420 may not allow the PDU session establishment procedure performed by the UE 410, and may need to refuse the corresponding request.

Subsequently, if NIDD configuration is performed between the $3^{rd}$ party AS 450 and the NEF 440, the $3^{rd}$ party AS 450 may need to transmit an application-level signaling so that the UE 410 is capable of performing PDU session establishment for the NIDD service, or may need to perform device triggering using a 3GPP network. Otherwise, the UE 410 may not be aware of when the UE 410 needs to perform a PDU session establishment procedure, and may not perform data transmission until a PDU session is established.

However, to enable the $3^{rd}$ party AS 450 to transmit the application-level signaling before the UE 410 establishes a PDU session for NIDD, another PDU session, which is different from the PDU session for NIDD, may be used. That is, there is a restriction in that the UE 410 necessarily has another PDU session other than the PDU session for NIDD. Also, in the case of device triggering, the UE 410 needs to support an SMS in order to support device triggering. In other words, the limitation of the current system requires IoT UEs developed simply with low costs to support additional functions.

The disclosure provides a procedure that successfully performs an NIDD session establishment procedure of the UE 410, even though NIDD configuration is not performed in advance, and establishes a connection for an NIDD service when the NIDD configuration is performed. Therefore, the 5G system may remove the dependency between the NIDD configuration and the NIDD PDU session establishment procedure of the UE 410. Also, the UE may not need to have another PDU session, and may not need to support an SMS. The $3^{rd}$ party AS 450 may not need to support an additional application-level operation or device triggering service for the UE 410 that uses the NIDD service.

According to the embodiments of the disclosure, FIG. 4 is a diagram illustrating a procedure in which the UE 410 establishes a PDU session for NIDD, and the operation performed after NIDD configuration is performed.

In operation S401, the UE 410 requests a PDU session establishment request to the SMF 420. The request message may include an indicator indicating that an NIDD service is to be used, or a DNN value indicating an NIDD service. Additionally, an external ID of the UE 410 that the UE 410 uses for the NIDD service may be included. The SMF 420 that receives the same may determine that the UE 410 establishes a PDU session for the NIDD service. The SMF 420 reports that the SMF 420 is to serve the UE 410 to the UDM 420 and may obtain subscription data of the UE 410 in operation S403.

In operation S405, the SMF 420 identifies that NIDD configuration information is not present in the subscription data of the UE 410 obtained in operation S403. The PDU session establishment request from the UE 410 is associated with the NIDD service. However, the NIDD configuration information is not included in the subscription data of the UE 410 and thus, the SMF 420 may determine that NIDD configuration is not performed yet. The NIDD configuration information may include at least one of the address or ID of the NEF 440 for providing the NIDD service to the UE 410, DNN information for providing the NIDD service to the UE 410, the address of the NEF 440 associated with a DNN for the NIDD service, and an external ID that the UE 410 uses for the NIDD service. However, the SMF 420 may identify whether the corresponding UE is a UE allowed to use the NIDD service, from the subscription data of the UE 410.

The identification method is based on at least one of the following operations. 1. determine whether a DNN in subscription data is identical to a DNN for NIDD requested by a UE, 2. determine whether an indicator indicating that a UE is allowed to use an NIDD service for a corresponding DNN is included, 3. determine whether a network slice that a UE uses is a network slice in which an NIDD service is usable, 4. determine whether an external ID that a UE uses for an NIDD service is included in subscription data, and determine whether the external ID is the same as a value that the UE transmits in a PDU session establishment procedure in operation S401, or 5. determine whether to allow information that allows a UE to use an NIDD service is included in subscription data.

If the NIDD configuration information is included in the subscription data received in operation S403, the SMF 420 may determine that the NIDD configuration has already been performed, may transmit a message of operation S417 to the address of the NEF 440 included in the corresponding information so as to perform NIDD service activation, and may complete a PDU session establishment procedure with the UE 410.

The SMF 420 that determines to provide the NIDD service to the UE 410 in operation S405, may configure a PDU session establishment accept message and transmit the same to the UE 410 in operation S407. Since NIDD configuration has not been performed yet, the NIDD service activation procedure is not performed between the SMF 420 and the NEF 440.

Accordingly, the message of operation S407 may include an indicator indicating that the PDU session establishment is successfully performed but the corresponding PDU session is not activated, that is, data transmission via the corresponding PDU session is not currently available. The UE 410 that receives the same may be aware that the PDU session for the corresponding NIDD is established but is not activated, and is incapable of transmitting data yet. Therefore, the UE 410 may determine not to transmit a service request for the corresponding PDU session until the corresponding PDU session is activated. If the UE 410 transmits a service request for the corresponding PDU session, the SMF may refuse the service request for the corresponding PDU session of the UE 410 if NIDD configuration is not yet performed and NIDD service activation is not performed. If the UE 410 transmits a service request for the corresponding PDU session and the NIDD configuration and the NIDD service activation were performed in advance, the SMF 420 may accept the service request and activate the PDU session.

As another example of operations S405 and S407, the SMF 420 may transmit a PDU session accept to the UE 410 via an AMF and a base station in operation S407. In this instance, the SMF 420 may determine not to transfer an N2 SM message for session establishment (a message between a base station and an SMF) to the base station. That is, the PDU session accept message is transferred to the UE 410, but the base station does not obtain information associated with establishment of a radio bearer for the UE 410 from the SMF 420, and thus, the base station may not establish a radio bearer with the UE 410. Since the radio bearer for the corresponding PDU session is not established with the base station, the UE 410 may determine that the corresponding PDU session is currently in a deactivated state.

In operation S411, the $3^{rd}$ party AS 450 may perform NIDD configuration with the NEF 440, for the 5G system on which the UE 410 is registered. The AS 450 and the NEF 440 may configure that a "data transmission service via an NEF" is to be used for a UE or a group of UEs. The UE is indicated by an external ID. The external ID is an identification used for the AS 450 to identify the UE 410, and also, may identify an internal ID (e.g., an SUCI, an SUPI, an IMSI, or the like) for identifying the UE 410 in the 5G system. The group of UEs may be indicated by an external group ID. The external group ID is an identification used for the AS to identify a group of predetermined UEs, and also may identify an internal group ID for identifying a group of UEs or an internal ID of each UE included in the group in the 5G system.

In operation S411, the NEF 440 and the AS 450 may set data transmission characteristics that the corresponding UE or group has, for example, maximum latency, the number of messages transmitted, a scheduled transmission time, a data transmission period of the UE, and the like. In operation S411, via the procedure with the UDM 430, the NEF 440 may obtain information indicating the SMF 420 that serves the UE 410 in association with the requested NIDD service. The SMF 420 registers the information indicating that the SMF 420 is to serve a PDU session for NIDD for the corresponding UE, in the UDM 430, in operation S403. Accordingly, the UDM 430 may report, to the NEF 440, the address or ID of the SMF 420 that serves the PDU session for NIDD for the corresponding UE.

The NEF 440 that obtains the address or ID of the SMF 420 may transmit a message of operation S413 to the corresponding SMF 420. This is a message for establishing a connection between the SMF 420 and the NEF 440 in order to support the NIDD service.

In the message for establishing the connection between the SMF 420 and the NEF 440 in order to support the NIDD service according to an embodiment of the disclosure may include an ID for identifying the UE 410, that is, an external ID, or an ID for identifying a group of UEs 410, that is, an external group ID. Also, information needed for providing the NIDD service to the UE 410 may be included. The information may include the ID of the NEF 440 and a reference ID for identifying the connection with the NEF 440 for NIDD service. Also, configuration information for the NIDD service may be included. The information may be information associated with the maximum latency needed when the corresponding UE or group performs data transmission, a data transmission period of the corresponding UE or group, or scheduled data transmission time, and the like.

The message of operation S413 may operate like an event subscription that requests the SMF 420 to transmit a report to the NEF 440 when the NIDD service is allowed and is provided to the UE 410. Therefore, the SMF 420 may store information included in the message of operation S413 received from the NEF 440.

The SMF 420 which determines that the NIDD service is providable to the UE 410, may report that the PDU session for the corresponding NIDD is activated to the UE 410 in operation S415. This may be performed in a manner that the SMF 420 requests reachability of the corresponding UE 410 from the AMF, the AMF performs paging of the UE 410, and the UE 410 transmits a service request in response thereto.

When the UE 410 responds via the service request, the AMF reports that the UE 410 has woken up to the SMF 420, and the SMF 420 may perform a procedure of activating a data path in association with the PDU session of the corresponding UE 410. Via the same, an N2 SM message is transmitted to a base station, and setting up of a radio bearer for the UE 410 is indicated to the base station.

The UE 410 that is aware that a radio bearer is established for a predetermined PDU session may determine that the data path of the PDU session for NIDD is activated. As another example, the SMF 420 may report that the corresponding PDU session is activated to the UE 410 using a PDU session modification procedure in an SM NAS procedure with the UE 410. In this instance, a PDU session ID and an indicator indicating that the corresponding PDU session is activated are included in a PDU session modification command message. The UE 410, which receives the same, may determine that the PDU session corresponding to the PDU session ID is activated. The UE 410 may identify the PDU session ID, and may identify whether the corresponding PDU session is a PDU session for NIDD.

The SMF 420, which activates the PDU session for NIDD for the UE 410, may transmit a message of operation S417 to the NEF 440, and may complete the NIDD service activation procedure between the SMF 420 and the NEF 440. In this instance, the SMF 420 may include, in the message, an external ID of the UE or an external group ID of a group that the UE belongs to, a reference ID for identifying a connection with the NEF 440 in association with a "data transmission service via an NEF" received in operation S413, the ID of the NEF 440 received in operation S413, and an SMF ID indicating itself. If data that the UE 410 transmits via the "data transmission service via an NEF" is present, the data may be included in the message of operation S417. The NEF 440 which receives the same may determine that a connection of the "data transmission service via an NEF" is established with the SMF 420 that transmits the message of operation S417, and the connection may be identified by a combination of the reference ID and the SMF ID.

If the NEF 440 receives data transmitted from the UE 410 in operation S417, the NEF 440 may identify the corresponding data, a UE ID, or a target ID, may determine the AS 450 to which the data is heading and the "data transmission service via an NEF" is configured, and may transmit the data to the corresponding AS 450 in operation S419.

Figure 5:
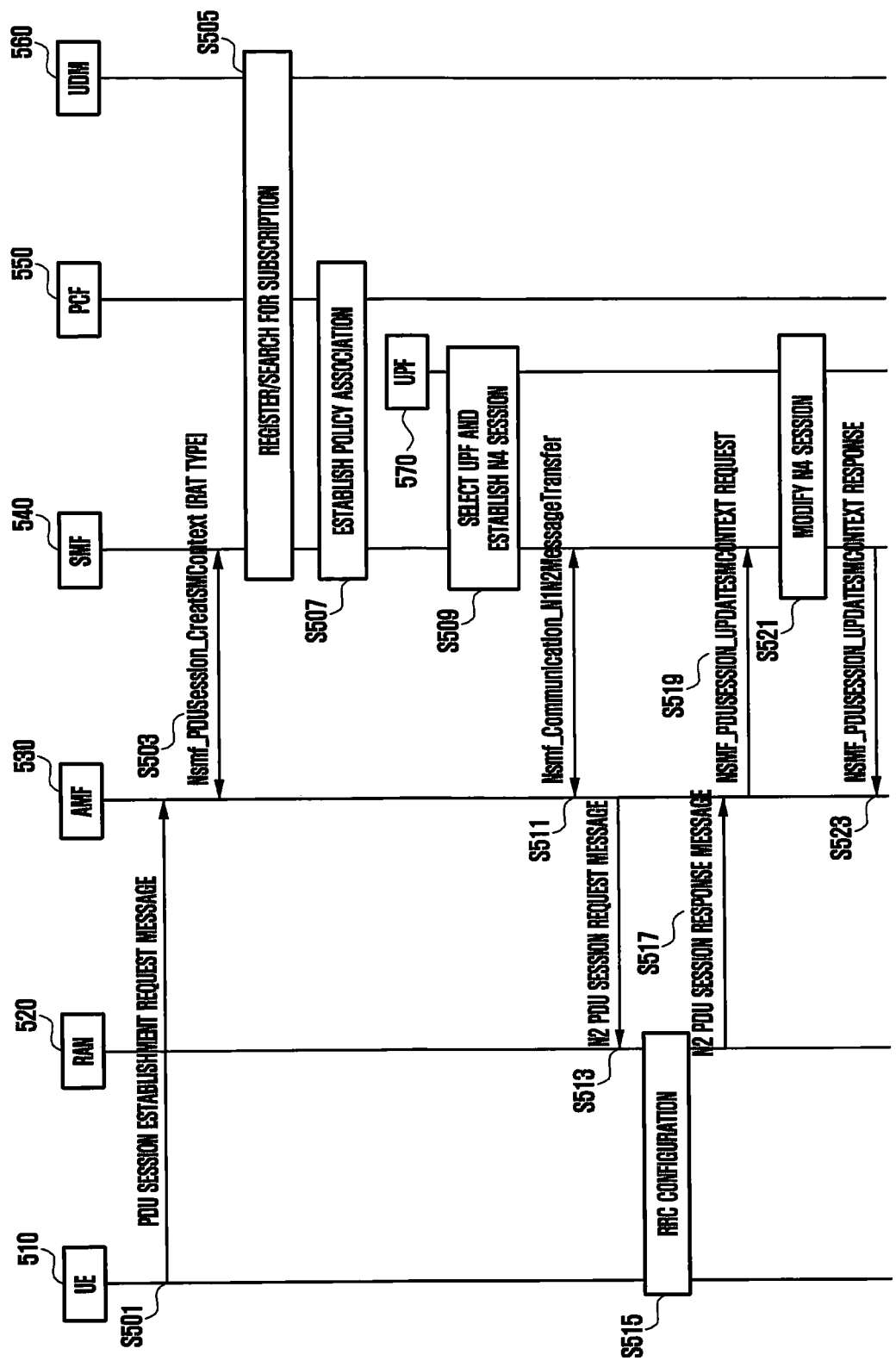
FIG. 5 is a diagram illustrating an operation in which, when establishing a PDU session, an SMF determines whether to apply small data rate control based on information received from an AMF, UDM, or PCF, and reports the same to a UE, according to an embodiment of the disclosure.

FIG. 5 illustrates a PDU session establishment operation by which a UE accesses a 5G system and establishes a data connection.

According to embodiments of the disclosure, an SMF 540 may determine whether to apply a small data rate control function, which is one of CIoT functions, to a corresponding UE 510 via the procedure of FIG. 5. As another example, via the procedure of FIG. 5, the SMF 540 may receive subscription information of the corresponding UE 510 or a policy associated with a corresponding DNN from a UDM 560 or a PCF 550. Based on the same, the SMF 540 may determine whether to apply the small data rate control function to the corresponding UE 510 or the corresponding DNN.

Detailed descriptions of each operation illustrated in FIG. 5 are as follows.

Operation S501: The UE 510 configures a PDU session establishment request, which is an SM NAS message, and transmits the same to an AMF 530 in order to establish a PDU session. The UE 510 includes a data network name (DNN) desired to be used in a PDU session establishment request message, and the UE 510 may set the DNN as a DNN value for CIoT. The DNN information may be used when the SMF 540 or the PCF 550 determines whether the corresponding DNN is a DNN allowed for the UE 510 to use for a CIoT service. Alternatively, the UE 510 may include a radio access technology type (RAT type) that the UE 510 currently uses, in the RAT session establishment request message. That is, the RAT type may indicate whether an RAT that the UE 510 currently accesses is NB-IoT, WB-EUTRAN, NR, NR-IoT (NR modified for IoT), LTE-M (which is an RAT type that an IoT UE uses and if the UE uses IoT-dedicated wireless technology, although the UE uses WB-EUTRAN, the RAT type may be identified as LTE-M). The indicator may include a meaning that a function needs to be applied differently depending on the RAT type, to the corresponding PDU session. That is, it is determined not to apply small data rate control to a UE that accesses NR. In the same manner, it is determined to apply small data rate control to a UE that accesses NB-IoT. Also, it is determined to apply small data rate control to a UE that accesses LTE-M. This information may be used later when the SMF 540 receives the PDU session establishment request message that the UE 510 transmits. The RAT type may be included in the PDU session establishment request message as NAS information, or may be included in PCO of the PDU session establishment request message.

Operation S503: The AMF 530 may select the SMF 540 based on the DNN value or the location of the UE, and may transfer an Nsmf_PDUSession_CreateSMContext request message to the selected SMF 540. The AMF 530 may include, in the message, the PDU session establishment request message received from the UE 510. Also, according to an embodiment of the disclosure, the AMF 530 may include the RAT type that the UE 510 currently accesses in Nsmf_PDUSession_CreateSMContext request. The AMF 530 may be aware of the RAT type that the UE 510 accesses, based on information received from a base station 520. For example, the AMF 530 may identify a tracking area code that the UE currently accesses, which is reported by the base station 520, and may recognize an RAT type corresponding to the tracking area code. The AMF 530 may determine that the UE 510 is a UE that uses a CIoT function, and may include the RAT type information in the Nsmf_PDUSession_CreateSMContext request message so as to inform the SMF 540 of the RAT type that the UE 510 currently accesses. A radio access technology type (RAT type) may indicate whether an RAT that a UE accesses is NB-IoT, WB-EUTRAN, NR, NR-IoT (NR modified for IoT), LTE-M (which is an RAT type that an IoT UE uses and if the UE uses IoT-dedicated wireless technology, although the UE uses WB-EUTRAN, the RAT type may be identified as LTE-M).

Operation S505: The SMF 540 receives the PDU session establishment request message received from the UE 510. The SMF 540 may perform a procedure of registering, in the UDM 560 that the SMF 540 is a serving SMF in order to obtain session-related subscription information associated with the UE 510, and may perform a procedure of obtaining subscription information for session management of the UE 510. The UDM 560 that receives the same may provide the subscription information to the SMF 540. The subscription information may include information indicating whether the UE 510 is capable of using a CIoT service, and information associated with whether to apply a CIoT-related function to the UE 510, for example, information associated with whether to apply small data rate control or information associated with whether to apply serving PLMN rate control. Alternatively, the subscription information may include information associated with whether to apply a CIoT-related function to the DNN to which the UE 510 subscribes, for example, information associated with whether to apply small data rate control or information associated with whether to apply serving PLMN rate control.

According to a detailed embodiment of the disclosure, if the RAT type indicating an RAT that the UE 510 currently accesses is included in the PDU session establishment request message received from the UE 510 or in the PCO of the corresponding message, the SMF 540 may store the RAT type in UE context, or may determine a CIoT function to be applied based on the RAT type of the UE.

Alternatively, if the RAT type indicating an RAT that the UE 510 currently accesses is included in the message of operation S503 received from the AMF 530, the SMF 540 may store the RAT type in the context of the UE 510, or may determine a CIoT function to be applied based on the RAT type of the UE 510.

The SMF 540 may determine whether to apply a small data rate control function to the UE 510 based on the RAT type. In this instance, the SMF 540 may identify the subscription information received from the UDM 560, and if an indicator indicating whether to apply a CIoT-related function, for example, small data rate control, is included in the corresponding subscription information, the SMF 540 may also make reference to the same. For example, if the UE 510 accesses via NB-IoT RAT, the SMF 540 may determine to apply a small data rate control function. As another example, if the UE 510 accesses via WB-ETURAN RAT, the SMF 540 may identify whether the DNN transmitted from the UE 510 is a DNN for CIoT, and may determine to apply a small data rate control function if the DNN is identified as a DNN for CIoT. As another example, if the UE 510 accesses via WB-ETURAN RAT, the SMF 540 may identify information that is included in the subscription information of the UE 510 received from the UDM 560 and that indicates whether to apply a small data rate control function, and may determine to apply a small data rate control function. As another example, if the UE 510 accesses via NR RAT, the SMF 540 may determine not to apply a small data rate control function to the UE 510. As another example, if the SMF determines that the UE 510 accesses via NR RAT, and identifies information, which indicates whether to apply a small data rate control function and which is included in the subscription information of the UE 510, or determines that the DNN that the UE 510 requests is a DNN for CIoT, the SW may determine to apply a small data rate control even to the UE 510 that accesses via NR RAT. As another example, if the UE 510 accesses via NR-IoT RAT, the SMF 540 may determine to apply a small data rate control function to the UE 510. As another example, if the UE 510 accesses via LTE-M RAT, the SMF 540 may determine to apply a small data rate control function to the UE 510.

Operation S507: The SMF 540 may identify the PDU session establishment request message received from the UE 510, and may perform an SM policy association establishment procedure with the PCF in association with the corresponding DNN. In this instance, the SMF 540 may transfer, to the PCF 550, the DNN that the UE 510 requests. The PCF 550 that receives the information may determine that the corresponding DNN is a DNN for the CIoT service, and may configure a session-related policy, which is to be transferred to the SMF 540, to include information indicating whether to apply a CIoT-related function, for example, whether to apply small data rate control.

Operation S509: The SMF 540 may configure a PCO to be provided to the UE 510. The PCO is the abbreviation of protocol configuration options. PCO is a container that includes additional configuration information which is needed to use a corresponding PDU session, and is information exchanged between the UE 510 and the SMF 540. According to an embodiment in operation S505 or S507, the SMF 540 may determine whether to apply small data rate control to the UE 510, and may set a value for the small data rate control in for the PCO. The value for the small data rate control may be a value set in the SMF 540, a value obtained by the SMF 540 from the UDM 560, or a value obtained by the SMF 540 from the PCF 550. Information previously configured (pre-configuration) in the SMF 540 may be set in the SMF 540 via an OAM system, or may be information previously configured in the SMF 540 in terms of network management by a mobile communication operator.

The PCO is included in a session management NAS message, called "PDU session establishment accept", and is transmitted to the UE 510 via the AMF 530 as an NAS message.

Operation S509: The SMF 540 selects the UPF 570 and establishes an N4 session.

Operation S511: The SMF 540 may include the PDU session establishment accept message to be transferred to the UE 510 and an N2 message to be transferred to the base station 520 in an Namf_Communication_N1N2messageTransfer message, and may transmit the same to the AMF 530. In the N2 message, a PDU Session ID, a QoS Profile, a QoS Flow ID, tunnel information of the side of the UPF 530 used for connecting an N3 tunnel between the UPF 570 and the base station 520, and the like may be included.

The AMF 530 may transfer, to the SMF 540, an ACK associated with the Namf_Communication_N1N2messageTransfer.

Operation S513: The AMF 530 may transfer the message received from the SMF 540 to the base station 520. In the message, an N2 SM message received from the SMF 540 and an N1 SM NAS message received from the SMF 540 may be included.

Operation S515: The base station 520 may receive the message of operation S513, and may perform an RRC signaling procedure for establishing a data radio bearer with the UE 510 according to QoS information included in the N2 SM message. Also, the base station 520 may transfer the received NAS message to the UE 510.

The UE 510 that receives the PDU session establishment accept message transmitted from the SMF 540 may complete the PDU session establishment procedure. The UE 510 may identify the PCO information included in the PDU session establishment accept message, and may identify information indicating whether to apply small data rate control and a value for applying small data rate control, which are included in the PCO. The UE 510 may apply the small data rate control configured as described above, when using the corresponding PDU session.

Operation S517: The base station 520 transmits a response in response to operation S513. In the message, an N2 SM message is included. A PDU session ID and tunnel information of the side of the base station 520 for connecting the N3 tunnel with the UPF 570 are included. Also, information associated with the established QoS flow and the like may be included.

Operation S519: The AMF 530 that receives the message of operation S517 may transfer the N2 SM message contained in the message of S517 to the SMF 540.

Operation S521: The SMF 540 may identify the N2 SM message received in operation S519, and may proceed with an N4 session modification procedure with the UPF 570. In this instance the SMF 540 may transfer the N3 tunnel information of the side of the base station 520, received from the base station 520, to the UPF 570, and may also transfer a packet forwarding rule associated therewith. It is considered that connection of the tunnel for data transmission or reception is established between the UPF 570 and the base station 520 via operation S521.

Operation S523: The SMF 540 transmits a response to the AMF 530 in response to operation S519.

The UE 510 is capable of performing data transmission or reception via the established PDU session.

Figure 6:
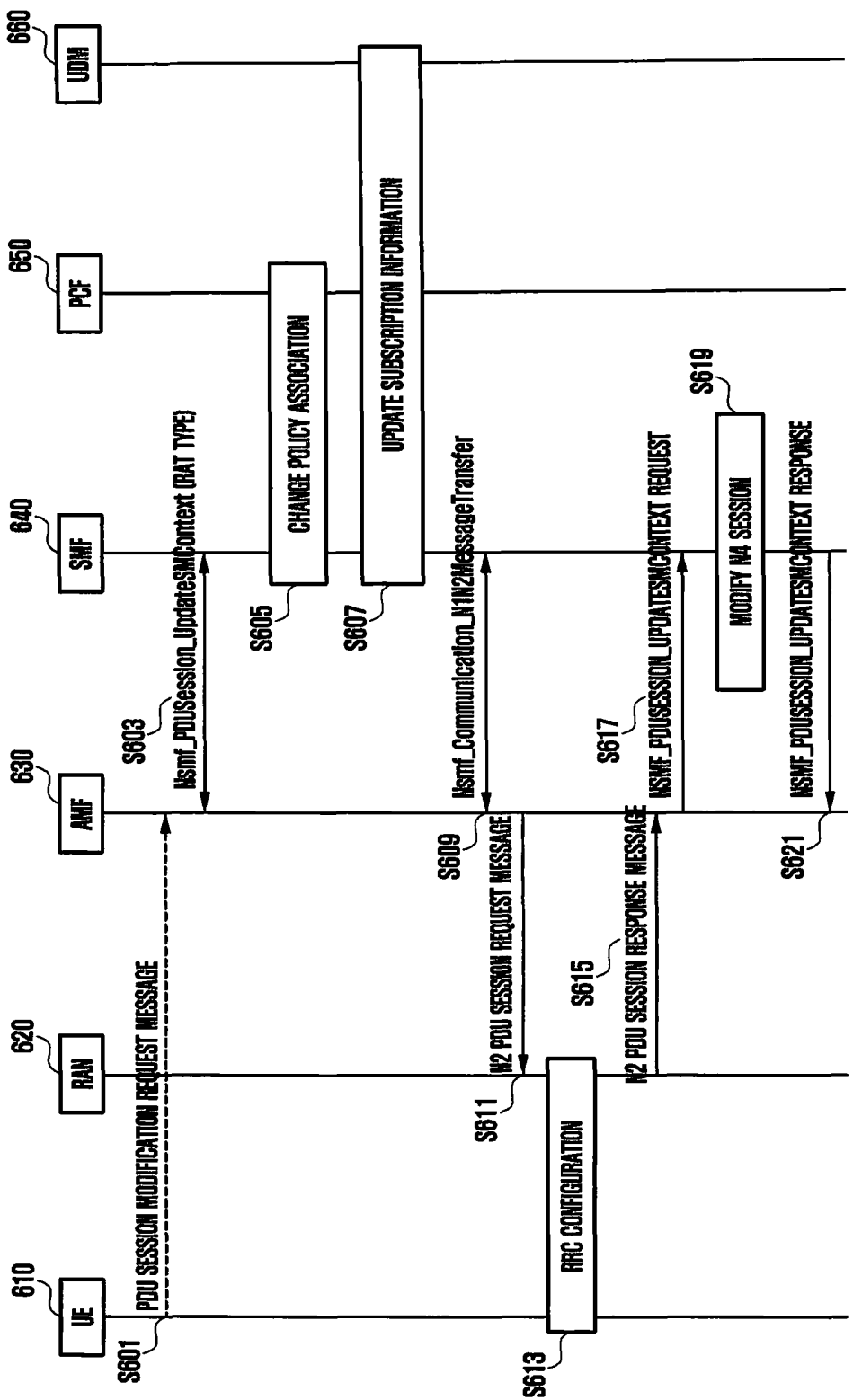
FIG. 6 is a diagram illustrating an operation in which, when a UE changes an RAT type, the UE reports the same to an SMF, and the SMF determines whether to apply small data rate control based on the changed RAT type and reports the same to the UE, according to an embodiment of the disclosure.

FIG. 6 is a diagram illustrating a method of updating information associated with whether to apply small data rate control to a UE and a small data rate control value, via a PDU session modification procedure.

An SMF 640 may set the updated information associated with whether to apply small data rate control and the updated small data rate control value in the PCO information, and may transfer the same to the UE 610 via the procedure of FIG. 6.

The PDU session modification procedure may be performed under the following condition.

change access RAT of UE: An AMF 630, which determines that an RAT that the UE 610 accesses is changed, may inform an SMF 640 of the change of an RAT type. Accordingly, the SMF 640, which determines that the RAT type of the UE 610 is changed, may determine to apply a CIoT function appropriate for the current RAT of the UE 610. For example, if the UE 610, to which small data rate control has been applied, is changed from NB-IoT to NR RAT, the SMF 640 may determine not to apply small data rate control. As another example, if the UE 610, which has been using NR RAT or WB-EUTRAN, changes its RAT type to NR-IoT or to LTE-M, the SMF 640 may determine to apply small data rate control. The SMF 640 may trigger a PDU session modification procedure in order to provide consecutive PDU sessions to the UE 610. In this instance, the SMF 640 may release small data rate control-related information in the PCO transmitted to the UE 610, so as not to apply small data rate control any longer. That is, small data rate control-related information may not be included or null or 0 is input, so as to indicate that there is no need to apply small data rate control. As another example, if the UE 610, which has been using a PDU session in NR RAT, changes to NB-IoT RAT or LTE-M RAT, the SMF 640 may determine to apply small data rate control to the corresponding to PDU session. The SMF 640 may trigger a PDU session modification procedure in order to provide consecutive PDU sessions to the UE 610. In this instance, the SMF 640 may include small data rate control-related information in the PCO transmitted to the UE 610, so as to apply small data rate control.

In operation S601, the UE 610 may configure a PDU session modification request, which is an SM NAS message, in order to change a PDU session since the RAT type of the UE 610 is changed. The UE 610 may transfer the PDU session modification request to the AMF 630. The UE 610 may include an RAT type indicating an RAT that the UE 610 accesses, in the PDU session modification message. Alternatively, the UE 610 may include PCO information in the PDU session modification message, and may include information indicating an RAT type of the UE 610 in the PCO. For example, the information may include at least one of NB-IoT, WB-EUTRAN, NR, NR-IoT, and LTE-M (which is an RAT type that the UE uses, and if the UE uses IoT-dedicated wireless technology although the UE uses WB-EUTRAN, the RAT type is identified as LTE-M). Subsequently, the information may be used when the SMF 640 determines a CIoT function to be applied based on the RAT type of the UE 610. Operation S601 occurs when the UE 610 triggers the operation, and the UE 610 may not perform operation S601 when the RAT type of the UE 610 is changed.

Operation S603: If the AMF 630 receives the message of operation S601, the AMF 630 may transfer an Nsmf_PDUSession_CreateSMContext request message to the SMF 640. The AMF 630 may include the PDU session modification request message received from the UE 610 in the Nsmf_PDUSession_CreateSMContext request. The AMF 630 may determine an RAT type of the UE 610 by identifying an RAT type that the base station 620 transmits. The AMF 630 may include the RAT type of the UE 610 in the Nsmf_PDUSession_CreateSMContext request message, and may transmit the same.

The SMF 640 may identify the RAT type received from the AMF 630, the RAT type included in the PDU session modification request message received from the UE 610, or the RAT type in the PCO, and may determine whether to apply a CIoT-related function, for example, a small data rate control function, to the corresponding UE 610.

As another example, if the RAT type of the UE 610 is changed, the AMF 630 may configure an Nsmf_PDUSession_CreateSMContext request message and may transmit the same to the SMF 640. The AMF 630 may determine the RAT type indicating an RAT that the UE 610 accesses by identifying a tracking area code transmitted from the base station 620 and an RAT type associated therewith. The AMF 630 may include the RAT type indicating an RAT that the UE 610 accesses in the Nsmf_PDUSession_CreateSMContext request message, and may transmit the same.

As another example, if the RAT type of the UE 610 is changed, the AMF 630 may transmit an event notification associated with the change of the RAT type to the SMF 640. The SMF 640 that receives the same may be aware that the RAT type of the UE 610 is changed, and may determine whether to apply a CIoT-related function, for example, a small data rate control function, to be applied to the corresponding RAT type. If it is determined to change application of the small data rate control function, the SMF 640 may proceed with operation S609. This may operate even if operation S601 is not performed.

Operation S605 is performed when the PCF 650 reports updated policy information to the SMF 640.

Operation S607: The SMF 640 may receive an update on a change of subscription information from the UDM 660, or may give an update on the current RAT type information of the UE 610 to the UDM and may receive an update on subscription information associated therewith.

Operation S609: The SMF 640, which determines that the RAT type of the UE 610 is changed, may determine whether to apply a CIoT-related function, for example, small data rate control, based on the changed RAT type.

In this instance, the SMF 640 may identify the subscription information received from the UDM 660, and if an indicator indicating whether to apply a CIoT-related function, for example, small data rate control, is included in the corresponding subscription information, the SMF 540 may also make reference to the same. For example, if the UE 610 accesses via. NB-IoT RAT, the SMF 640 may determine to apply a small data rate control function. As another example, if the UE 610 accesses via WB-ETURAN RAT, the SMF 640 may identify whether a DNN that the UE 610 uses is a DNN for CIoT, and may determine to apply a small data rate control function if the DNN is identified as a DNN for CIoT. As another example, if the UE 610 accesses via WB-ETURAN RAT, the SMF 640 may identify information, which is included in the subscription information of the UE 610 received from the UDM and which indicates whether to apply a small data rate control function, and may determine to apply the small data rate control function. As another example, if the UE 610 accesses via NR RAT, the SMF 640 may determine not to apply a small data rate control function to the UE. As another example, if the SMF determines that the UE 610 accesses via NR RAT, and identifies information, which indicates whether to apply a small data rate control function and which is included in the subscription information of the UE 610 or determines that a DNN that the UE 610 requests is a DNN for CIoT, the SMF may determine to apply the small data rate control to the UE 610 that access via NR RAT. As another example, if the UE 610 accesses via NR-IoT RAT, the SMF 540 may determine to apply a small data rate control function to the UE 610. As another example, if the RAT type indicating an RAT that the UE 610 accesses is LTE-M, the SMF 640 may determine to apply a small data rate control function to the UE 610.

The SMF 640, which determines the same, may configure information associated with whether to apply small data rate control or a value for applying small data rate control in PCO, and may transfer the PCO to the UE 610. In this instance, a PDU session modification command, which is an SM NAS message, may be used. The message may be transferred to the AMF 630 via operation S609, and the AMF 630 may transfer the same to the UE 610 in operations S611 and S613.

Operation S613: The base station may receive the message of operation S611, and may perform an RRC signaling procedure for establishing a data radio bearer with the UE 610 according to QoS information included in an N2 SM message. Also, the base station 620 may transfer the received NAS message to the UE 610. The UE 610 may identify an N1 SM NAS message received from the SMF 640, and may identify the PCO included in the message. The UE 610 may identify the small data rate control information included in the PCO, and may determine whether to apply small data rate control. If the small data rate control information is not included in the PCO, the UE 610 may determine not to apply small data rate control. Alternatively, if the value for applying small data rate control set in the PCO is set to null or 0, the UE 610 may determine not to apply small data rate control. The UE 610 may configure a PDU session modification complete message, which indicates completion of the PDU session modification procedure, as an N1 SM NAS message, and may transmit the same to the SMF 640.

Operation S615: The base station 620 transmits a response in response to operation S613. In the message, an N2 SM message is included. If the UE 610 configures the PDU session modification complete message as an N1 SM NAS message, the N1 SM NAS message may also be included.

Operation S617: The AMF 630, which receives the message of operation S615, may transfer the N2 SM message and the N1 SM NAS message contained in the message of S615 to the SMF 640.

Operation S619: The SMF 640 may identify the N2 SM message received in operation S617, and may proceed with an N4 session modification procedure with the UPF. In this instance, the SMF 640 may transfer the N3 tunnel information of the base station side, received from the base station 620, to the UPF, and may also transfer a packet forwarding rule associated therewith. In operation S621, the SMF 640 transmits a response to the AMF 630 in response to operation S617.

Figure 7:
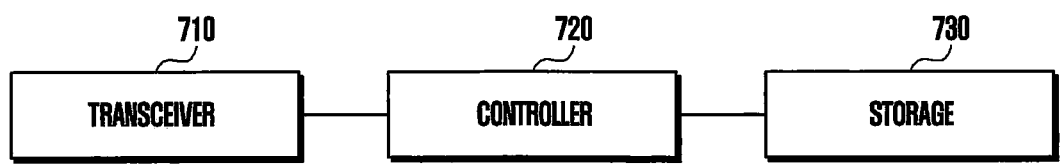
FIG. 7 is a diagram illustrating the structure of a UE according to an embodiment of the disclosure.

FIG. 7 is a diagram illustrating the structure of a user equipment (UE) according to an embodiment of the disclosure.

The UE of FIG. 7 is a user equipment illustrated in FIGS. 1 to 6. Referring to FIG. 7, the UE may include a transceiver 710, a controller 720, and a storage 730. In the disclosure, the controller may be defined as a circuit, an application-specified integrated circuit, or at least one processor.

The transceiver 710 may perform signal transmission or reception with another network entity.

The controller 720 may control overall operation of the UE according to the embodiments. For example, the controller 720 may control a signal flow so that operation is performed according to the flowcharts of FIG. 1 to FIG. 6.

The storage 730 may store at least one piece of information among information transmitted or received via the transceiver 710 and information generated by the controller 720.

Figure 8:
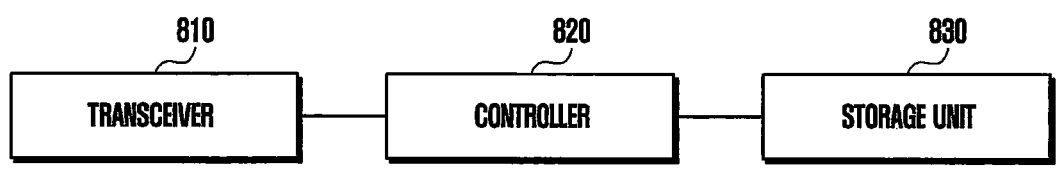
FIG. 8 is a diagram illustrating the structure of a network entity according to an embodiment of the disclosure.

FIG. 8 is a diagram illustrating the structure of a network entity according to an embodiment of the disclosure. The network entity of FIG. 8 may be each of the plurality of network entities of FIG. 1 to FIG. 6. For example, the network entity of FIG. 8 may be an AMF, an SMF, a UPF, a UDM, an NEF, or an AS/AF.

Referring to FIG. 8, the network entity may include a transceiver 810, a controller 820, and a storage 830. In the disclosure, the controller may be defined as a circuit, an application-specified integrated circuit, or at least one processor.

The transceiver 810 may perform signal transmission or reception with another network entity. The transceiver 810 may transmit, for example, system information to a UE, and may transmit a synchronization signal or a reference signal.

The controller 820 may control overall operation of a network entity according to the embodiments. For example, the controller 820 may control a signal flow so that operation is performed according to the flowcharts of FIG. 1 to FIG. 6.

The storage 830 may store at least one piece of information among information transmitted or received via the transceiver 810 and information generated by the controller 820.

The invention claimed is:

1. A method performed by a session management function (SMF) in a wireless communication system, the method comprising:
    receiving, from an access management function (AMF), a first message, wherein the first message includes a radio access technology (RAT) type of a user equipment (UE);
    determining whether to apply a small data rate control function to the UE based on the RAT type; and
    transmitting, to the AMF, a second message, wherein the second message includes a small data rate control parameter.

2. The method of claim 1, wherein the small data rate control parameter includes a number of packets per time unit.

3. The method of claim 2, wherein the small data rate control parameter is included by protocol configuration options (PCO).

4. The method of claim 1, wherein the RAT type is determined by long term evolution-machine type communication (LTE-M) or new radio (NR).

5. A method performed by an access management function (AMF) in a wireless communication system, the method comprising:
    transmitting, to a session management function (SMF), a first message, wherein the first message includes a radio access technology (RAT) type of a user equipment (UE); and
    receiving, from the SMF, a second message, wherein the second message includes a small data rate control parameter, and
    wherein whether to apply a small data rate control function to the UE based on the RAT type is determined by the SMF.

6. The method of claim 5, wherein the small data rate control parameter includes a number of packets per time unit.

7. The method of claim 6, wherein the small data rate control parameter is included by protocol configuration options (PCO).

8. The method of claim 5, wherein the RAT type is determined by long term evolution-machine type communication (LTE-M) or new radio (NR).

9. A session management function (SMF) in a wireless communication system, the SMF comprising:
    a transceiver; and
    a controller coupled with the transceiver and configured to:
        receive, from an access management function (AMF), a first message, wherein the first message includes a radio access technology (RAT) type of a user equipment (UE),
        determine whether to apply a small data rate control function to the UE based on the RAT type, and transmit, to the AMF, a second message, wherein the second message includes a small data rate control parameter.

10. The SMF of claim 9, wherein the small data rate control parameter includes a number of packets per time unit.

11. The SMF of claim 10, wherein the small data rate control parameter is included by protocol configuration options (PCO).

12. The SMF of claim 9, wherein the RAT type is determined by long term evolution-machine type communication (LTE-M) or new radio (NR).

13. An access management function (AMF) in a wireless communication system, the AMF comprising:
 a transceiver; and
 a controller coupled with the transceiver and configured to:
  transmit, to a session management function (SMF), a first message, wherein the first message includes a radio access technology (RAT) type of a user equipment (UE), and
  receive, from the SMF, a second message,
  wherein the second message includes a small data rate control parameter, and
  wherein whether to apply a small data rate control function to the UE based on the RAT type is determined by the SMF.

14. The AMF of claim 13, wherein the small data rate control parameter includes a number of packets per time unit, and wherein the small data rate control parameter is included by protocol configuration options (PCO).

15. The AMF of claim 13, wherein the RAT type is determined by long term evolution-machine type communication (LTE-M) or new radio (NR).

* * * * *